US012363262B2

(12) United States Patent
Kair et al.

(10) Patent No.: US 12,363,262 B2
(45) Date of Patent: *Jul. 15, 2025

(54) SECURE NETWORKING TECHNIQUES FOR ACQUISITION AND TRANSMISSION OF IMAGES

(71) Applicants: CHERTOFF GROUP, LLC, Washington, DC (US); SureScan Corporation, Binghamton, NY (US)

(72) Inventors: Lee R. Kair, Fairfax, VA (US); Jeffery J. Hamel, Methuen, MA (US); Daniel S. Poder, Brookline, MA (US); Metin K. Alaybeyoglu, Clarksburg, MD (US); George M. Hardy, III, Seminole, FL (US); James M. Connelly, Medford, MA (US); Edward M. Olin, Jr., Andover, MD (US)

(73) Assignees: CHERTOFF GROUP, LLC, Washington, DC (US); SureScan Corporation, Binghamton, NY (US)

(*) Notice: Subject to any disclaimer, the term of this patent is extended or adjusted under 35 U.S.C. 154(b) by 113 days.

This patent is subject to a terminal disclaimer.

(21) Appl. No.: 18/446,235

(22) Filed: Aug. 8, 2023

(65) Prior Publication Data

US 2024/0137471 A1 Apr. 25, 2024
US 2024/0236275 A9 Jul. 11, 2024

Related U.S. Application Data

(60) Provisional application No. 63/417,850, filed on Oct. 20, 2022.

(51) Int. Cl.
*H04N 7/18* (2006.01)
*G06T 3/40* (2024.01)
*G06T 11/00* (2006.01)

(52) U.S. Cl.
CPC .............. *H04N 7/181* (2013.01); *G06T 3/40* (2013.01); *G06T 11/00* (2013.01)

(58) Field of Classification Search
CPC ............ H04N 7/181; G06T 3/40; G06T 11/00
See application file for complete search history.

(56) References Cited

U.S. PATENT DOCUMENTS 6,707,879 B2 3/2004 McClelland et al.
7,193,515 B1 3/2007 Roberts et al.
(Continued)

FOREIGN PATENT DOCUMENTS

WO 2018/023190 A1 2/2018

*Primary Examiner* — Michael E Teitelbaum
(74) *Attorney, Agent, or Firm* — TUCKER ELLIS LLP; J. Derek Mason

(57) ABSTRACT

A method for remote identification of security threats in an imaged object including transmitting an initialization signal to a first threat detection scanner over a communication network, the first threat detection scanner being located at a separate physical location, receiving a ready-to-send signal from the first threat detection scanner, the ready-to-send signal including a storage location of a scan image generated by the first threat detection scanner for security inspection, receiving the scan image from the first threat detection scanner, transmitting, after receiving the scan image from the first threat detection scanner, a second initialization signal to a second threat detection scanner at the separate physical location, generating a threat detection report based on a rendering of the scan image, and transmitting the threat detection report to the first threat detection scanner.

20 Claims, 20 Drawing Sheets

(56) References Cited

U.S. PATENT DOCUMENTS

| | | |
|---|---|---|
| 9,014,425 B2 | 4/2015 | Perron |
| 9,094,580 B2 | 7/2015 | Song et al. |
| 9,245,175 B1 | 1/2016 | Vladimir et al. |
| 9,773,173 B2 | 9/2017 | Perron |
| 10,275,660 B2 | 4/2019 | Perron |
| 11,336,674 B2 | 5/2022 | Kair et al. |
| 11,846,746 B2 | 12/2023 | Kair et al. |
| 2008/0005804 A1 | 1/2008 | Rodriguez et al. |
| 2009/0231134 A1 | 9/2009 | Modica et al. |
| 2012/0243741 A1 | 9/2012 | Shet et al. |
| 2014/0028457 A1 | 1/2014 | Reinpoldt et al. |
| 2014/0189048 A1 | 7/2014 | Messinger et al. |
| 2015/0186732 A1 | 7/2015 | Perron |
| 2017/0111497 A1 | 4/2017 | Starr |
| 2017/0357857 A1 | 12/2017 | Perron |

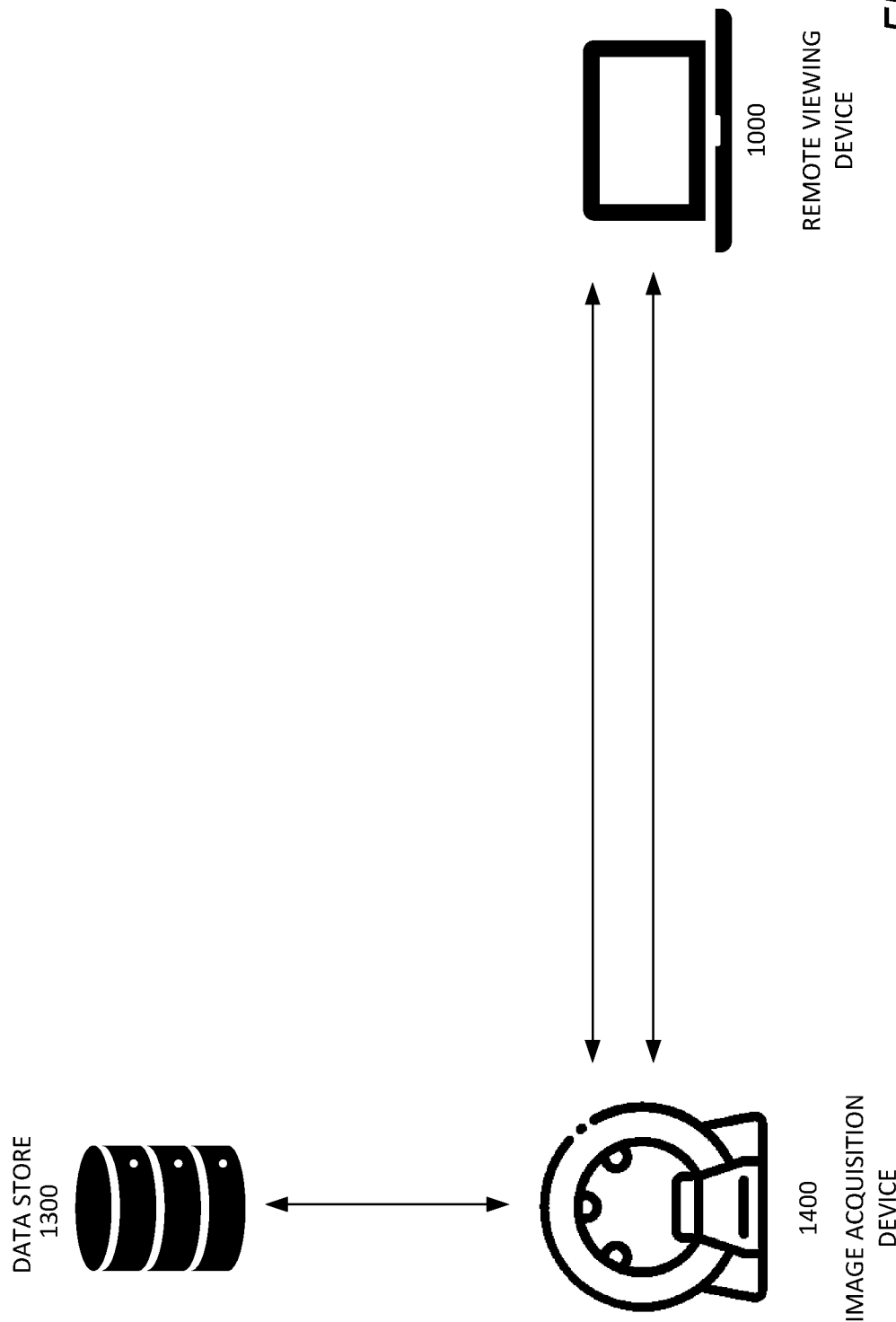

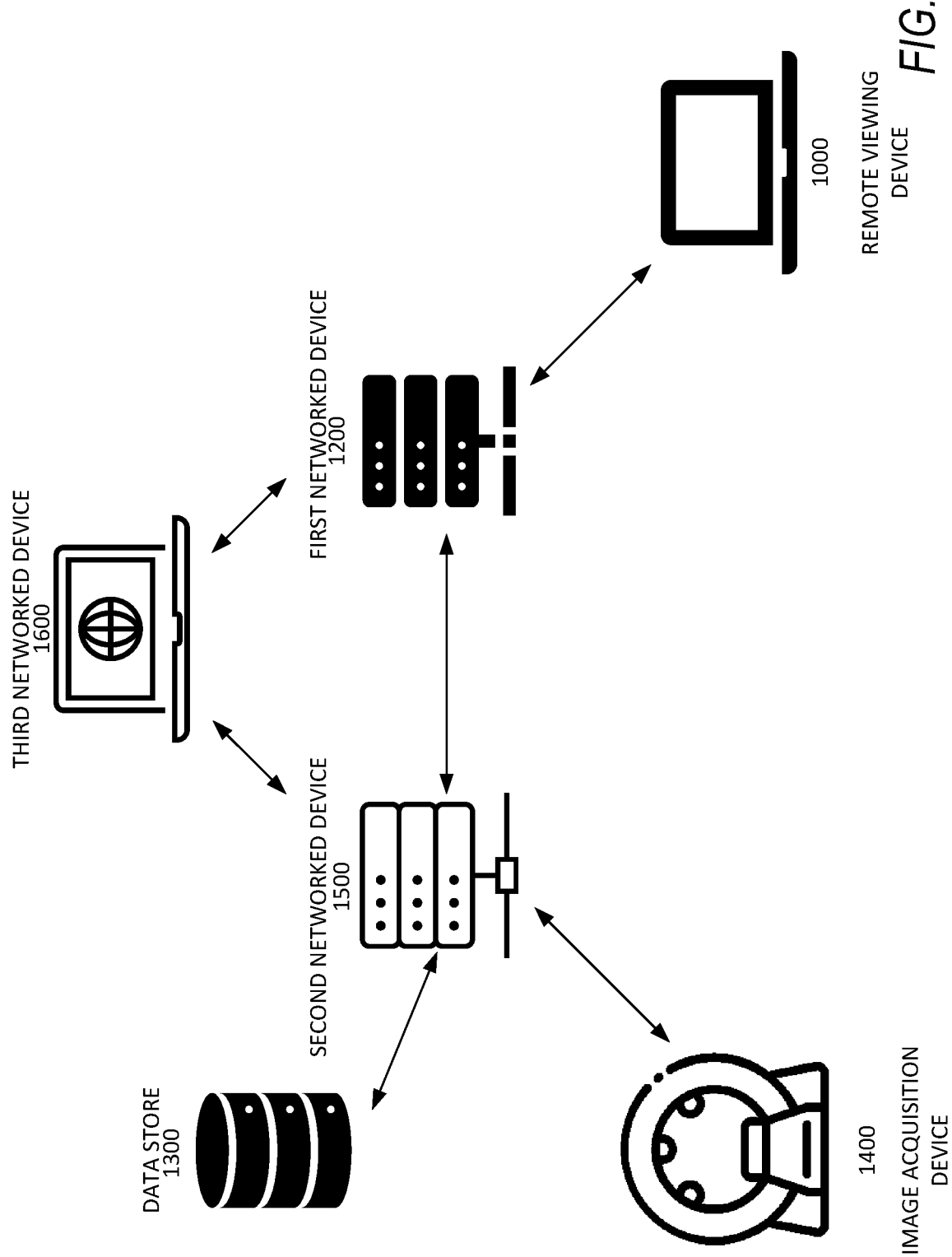

SECURE NETWORKING TECHNIQUES FOR ACQUISITION AND TRANSMISSION OF IMAGES

CROSS-REFERENCE TO RELATED APPLICATIONS

The present application claims priority to U.S. Provisional Application No. 63/417,850, filed Oct. 20, 2022, which is incorporated herein by reference in its entirety for all purposes.

FEDERAL FUNDING DISCLOSURE

This disclosure was made with government support under 70RSAT21C00000058 awarded by the United States Department of Homeland Security. The government has certain rights to the disclosure.

BACKGROUND

Field of the Disclosure

The present disclosure relates to secure acquisition and transmission of images.

Description of the Related Art

An imaging device can acquire an image or set of images, wherein each image can be processed and analyzed to identify objects of interest.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

In one embodiment, the present disclosure is related to a method for remote identification of security threats in an imaged object, comprising transmitting, via processing circuitry, an initialization signal to a first threat detection scanner over a communication network, the first threat detection scanner being located at a separate physical location; receiving, via the processing circuitry, a ready-to-send signal from the first threat detection scanner over the communication network, the ready-to-send signal including a storage location of a scan image generated by the first threat detection scanner for security inspection; receiving, via the processing circuitry, the scan image from the first threat detection scanner over the communication network, the scan image being encrypted and compressed; transmitting, via the processing circuitry and after receiving the scan image from the first threat detection scanner, a second initialization signal to a second threat detection scanner at the separate physical location over the communication network via the processing circuitry; generating, via the processing circuitry, a threat detection report based on a rendering of the scan image, the threat detection report indicating a security threat in the scan image; and transmitting, via the processing circuitry, the threat detection report to the first threat detection scanner over the communication network.

In one embodiment, the present disclosure is related to a device comprising processing circuitry configured to transmit an initialization signal to a first threat detection scanner over a communication network, the first threat detection scanner being located at a separate physical location from the device, receive a ready-to-send signal from the first threat detection scanner over the communication network, the ready-to-send signal including a storage location of a scan image generated by the first threat detection scanner for security inspection; receive the scan image from the first threat detection scanner over the communication network, the scan image being encrypted and compressed; transmit, after receiving the scan image from the first threat detection scanner, a second initialization signal to a second threat detection scanner at the separate physical location over the communication network; generate a threat detection report based on a rendering of the scan image, the threat detection report indicating a security threat in the scan image; and transmit the threat detection report to the first threat detection scanner over the communication network.

In one embodiment, the present disclosure is related to a non-transitory computer-readable storage medium for storing computer-readable instructions that, when executed by a computer, cause the computer to perform a method, the method comprising transmitting an initialization signal to a first threat detection scanner over a communication network, the first threat detection scanner being located at a separate physical location from the computer; receiving a ready-to-send signal from the first threat detection scanner over the communication network, the ready-to-send signal including a storage location of a scan image generated by the first threat detection scanner for security inspection; receiving the scan image from the first threat detection scanner over the communication network, the scan image being encrypted and compressed; transmitting, after receiving the scan image from the first threat detection scanner, a second initialization signal to a second threat detection scanner at the separate physical location over the communication network; generating a threat detection report based on a rendering of the scan image, the threat detection report indicating a presence of a security threat in the scan image; and transmitting the threat detection report to the first threat detection scanner over the communication network.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1A is a schematic of a networked system for acquiring and transmitting scan images, according to an exemplary embodiment of the present disclosure;

FIG. 1C is a schematic of a networked system for acquiring and transmitting scan image, according to an exemplary embodiment of the present disclosure;

DETAILED DESCRIPTION

Figure 1B:
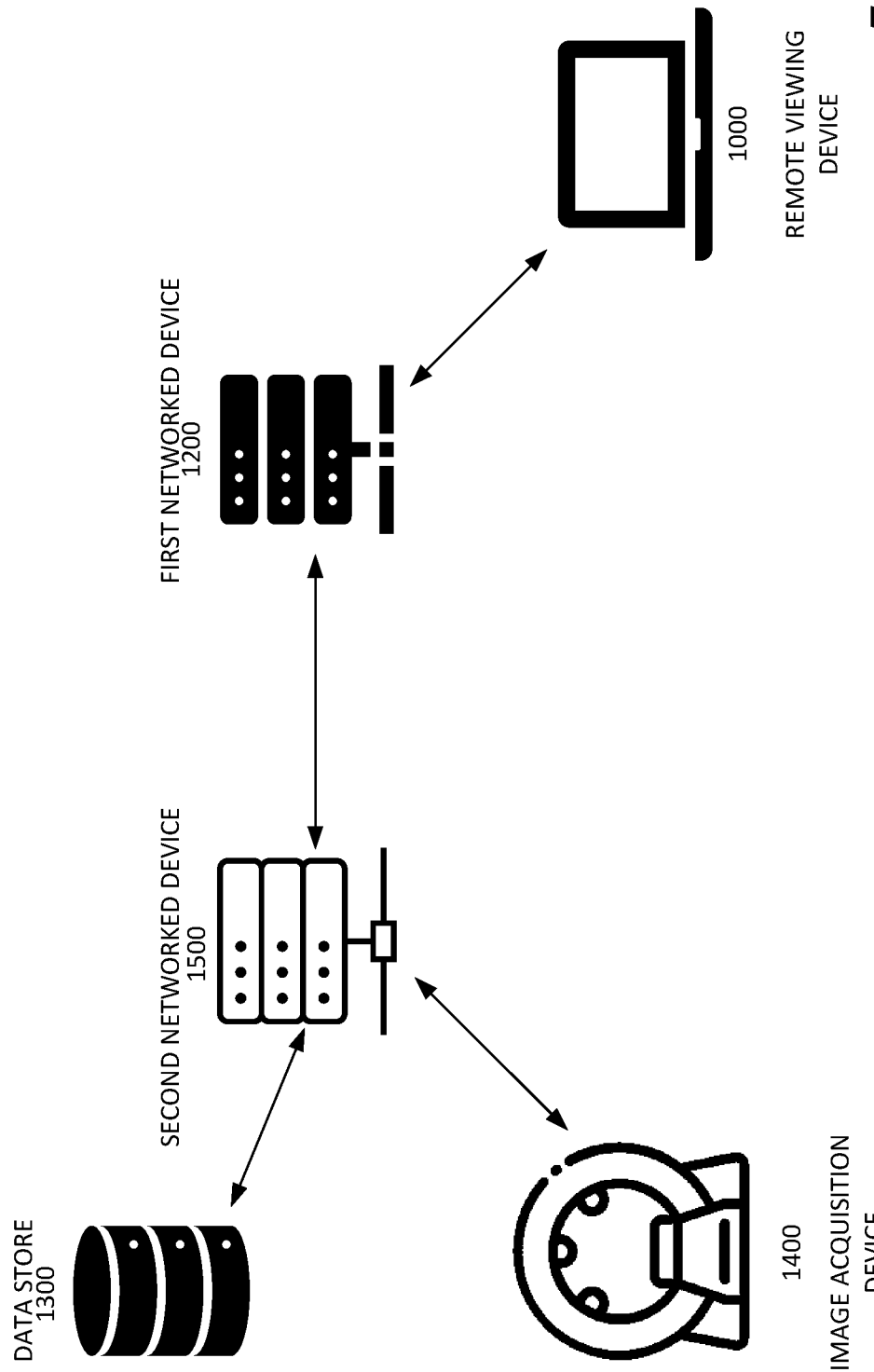
FIG. 1B is a schematic of a networked system for acquiring and transmitting scan images, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

In one embodiment, the present disclosure is directed towards systems and methods for secure transmission of images from one or more image acquisition devices to one or more remote viewing devices for analysis while minimizing interruption or delay in acquisition of the images. The image acquisition devices can include, for example, computed tomography (CT) scanners, single- and multi-view X-ray scanners, X-ray diffraction systems, coherent X-ray diffraction imaging systems, phase contrast X-ray imaging systems, magnetic resonance imaging (MRI) scanners, projection scanners, cameras, and similar or analogous devices, including those used in the context of security monitoring. The image acquisition devices can be referred to herein as threat detection scanners and can be configured to collect scan data. The scan data can include, for example, image data acquired by an image sensor, radiation measurements (e.g., X-Ray measurements), magnetic field measurements, etc. The scan data can include a single image, a set of images, or one or more image slices. An image acquisition device can process the scan data to generate a scan image. In one example, the scan data can include one or more image slices, and the image acquisition device can append the one or more image slices to generate an image for display. In one example, the scan data can include raw imaging data from an image sensor, and the image acquisition device can process the imaging data to generate an image for display. References to image acquisition devices herein are for illustrative purposes rather than as a limitation on the embodiments of the disclosure. The remote viewing devices can include user devices such as computers, tablets, and mobile devices, as will be described in further detail herein. Images acquired by the image acquisition devices can be transmitted to the remote viewing devices and can be analyzed by a combination of automated image processing and operator review to identify and categorize objects captured in the images. In one embodiment, the image acquisition devices can acquire and transmit a series or sequence of images to remote viewing devices over time.

As a non-limiting example, carry-on luggage at an airport can be imaged by CT scanners to reveal the contents of the luggage and prevent passengers from bringing weapons or other prohibited items onto an airplane. The CT images of the luggage can be analyzed by an automated object detection algorithm as well as by security officers, such as image interpretation officers, in order to identify prohibited items within the luggage without opening the luggage for a physical inspection. Airport security lines are an example of an environment wherein a set of images is collected over time and wherein each image in the set of images must be analyzed sequentially and in real time without interrupting or causing delay in the acquisition of the set of images. Security officers operate the CT scanners and analyze each image as it is displayed, typically at the location of the CT scanner. Each image acquired by a CT scanner must be analyzed before a following image can be analyzed so as to prevent interruption of the flow of luggage. Delays or downtime in the process can have increasing downstream effects, greatly reducing the efficiency and accuracy of the scanning process.

It can be advantageous to analyze an image acquired by an image acquisition device at a separate physical location from the location of the image acquisition device, wherein the image can be accessed by a remote viewing device at the separate (different) physical location. Similarly, the image acquisition device can be referred to as being in a separate physical location from the location of the remote viewing device. In one embodiment, a separate physical location can be a separate (different) geographical location, e.g., a different city, region, county, state, country, etc. For example, luggage can be imaged by a CT scanner at an airport in a first location and the CT images can be transmitted to a remote viewing device in a separate physical location. The separate physical location of the remote viewing device can be a different city or state, a different region, etc. from the first location of the CT scanner. Thus, the CT scan of the luggage that is acquired at the airport can be displayed and evaluated at a remote viewing device that is, for example, at an airport or a dedicated viewing center facility in a different part of the country. For example, a CT scan of luggage can be acquired at a first airport. The CT scan can be transmitted to a remote viewing device at a second airport in a different region, city, state, etc. The CT scan can be evaluated at the second airport by an image interpretation officer using existing airport equipment that is already configured to acquire, display, and process CT scans. The evaluation of the CT scan can then be transmitted back to the scanner at the first airport so that the luggage can be inspected if it does contain a threat or allowed to pass through the scanner. In this manner, the image analysis capacity of the second airport can be directed towards the workflow of the first airport in order to maximize utilization of available resources across a number of separate physical locations. The CT scanner at the first airport can be one example of an image acquisition device at a first location. In some examples, the first location can be a transport facility, such as a train station or port. In some examples, the first location can be a security checkpoint, such as an entrance into a building or any threshold where persons or objects can be searched. The remote viewing device can be located at a remote viewing center, or a remote external site outside of the boundaries of the first location.

In one embodiment, the separate physical location from the first location can be within a geographical or physical proximity to the first location. For example, a first location can be a first airport in a city and a second location can be at a second airport in the same city. The systems and methods of the present disclosure can also be compatible with devices in the same or similar locations. For example, a remote viewing device at a separate physical location can refer to a remote viewing device in a different security lane, different terminal, or different room from an image acquisition device. In one embodiment, an image acquisition device and a remote viewing device can be in the same region, same facility or building, same room, etc. In one example, the remote viewing device and the image acquisition device can be located in a security lane, with the image acquisition device being located at a scanning checkpoint in the middle of the security lane and the remote viewing device being located separately at the end of the security lane. The remote viewing device can analyze the stream of images from the image acquisition device as disclosed herein regardless of the location or relative location of either device.

In one embodiment, the timing of image acquisition, as well as downstream processing and transfer of the image to the remote viewing device, can be coordinated so as to not interrupt or delay ongoing acquisition of new images by the image acquisition device. In addition, many environments can have more than one image acquisition device and more than one remote viewing device configured for image analysis. Images from each image acquisition device can be analyzed in parallel while maintaining the approximate order of image acquisition. In one example, an airport security checkpoint can include several CT scanners operating in parallel at different security lanes, wherein luggage can pass through any of the CT scanners. In each CT scanner, a first image of a first piece of luggage must be assessed for a threat so that the first piece of luggage can pass through the security checkpoint. A next image of a second piece of luggage is then collected and assessed for a threat. The scanning and assessment of each piece of luggage is performed in sequence in order to maintain a regular queue. In one embodiment, the present disclosure can provide a networked architecture for secure transfer of an acquired image from an image acquisition device to a remote viewing device in environments containing more than one image acquisition device and more than one remote viewing device. In one embodiment, the present disclosure provides systems and methods to reduce latency or delay in one or more steps involved in image acquisition, transfer, and analysis so that an image can be transferred to the remote viewing device at a separate physical location without introducing delay into the image analysis process as a whole. In addition, the systems and methods presented herein can include steps for securing acquisition, storage, and transfer of image data to prevent falsified data from entering the system during remote viewing.

FIG. 1A is a schematic of a remote viewing device 1000 in communication with an image acquisition device 1400. The remote viewing device 1000 can be in communication with the image acquisition device 1400 via a channel as defined by the transmission control protocol (TCP/IP). For example, the channel can be a C2 (Command and Control) port. In one embodiment, the remote viewing device 1000 can broadcast signals to the image acquisition device 1400 and receive image data from the image acquisition device 1400 over the C2 channel. In one embodiment, the remote viewing device 1000 can be in network communication with data store 1300. In one embodiment, the data store 1300 can be disk storage and can be configured for full-volume encryption. In one embodiment, the data store 1300 can be a server hosting a database. In one embodiment, the data store 1300 can be accessed by an image acquisition device 1400 via a TCP/IP channel or by a wired/wireless communication network. The image acquisition device 1400 can be configured to store scan data in the data store 1300 and receive data from the data store 1300. In one embodiment, the remote viewing device 1000 can also access the data store 1300 via a TCP/IP channel or by a wired/wireless communication network.

In one embodiment, the present disclosure can be directed towards one or more hardware modules (e.g., processing circuitry) configured for transmitting information between a remote viewing device 1000 and an image acquisition device 1400. In one embodiment, the hardware module can include one or more components from the hardware system of FIG. 8, such as a processor 510, a memory 520, a storage device 530, and a bus 550, and/or one or more components from the device of FIG. 9, such as a CPU 600, a storage control 624, a disk 604, etc. In one embodiment, the hardware module can be coupled to a device and can transmit data from the device to a remote hardware module at a separate physical location according to the methods presented herein. In one embodiment, the hardware module can be coupled to a device via a bus or a cabled connection. In one embodiment, the hardware module can be integrated into or embedded in a device. In one embodiment, the hardware module can be coupled to a device via a network connection. The hardware module can transmit instructions to the coupled device. In one embodiment, the hardware module can be a single hardware module, wherein the hardware module can transmit data between two or more devices. The hardware module can be compatible with a number of devices, including, but not limited to, scanners, imaging devices, viewing devices, user devices or computers, etc. In this manner, the hardware module can provide a flexible and modular configuration of connected devices. The hardware modules can be referred to herein as networked devices, wherein a first hardware module can be configured to communicate over a network connection (e.g., a TCP/IP channel) with a second hardware module in the same or in a separate physical location. Hardware modules can thus facilitate data transmission between the devices to which each hardware module is coupled.

For example, the image acquisition device 1400 as referenced herein can include a first hardware module coupled to a scanner or imaging device (e.g., a CT scanner). In one embodiment, the first hardware module can be coupled to the scanner such that the first hardware module can access and process scan data acquired by the scanner. In one embodiment, the hardware module can store the scan data acquired by the scanner. In one embodiment, the first hardware module coupled to the scanner can transmit data to a second hardware module coupled to a device at a separate physical location. In one embodiment, the remote viewing device 1000 as referenced herein can include a second hardware module coupled to a viewing device. The viewing device can be, for example, a user device 20 of FIG. 7, a computer 500 of FIG. 8, or a device 601 of FIG. 9. In one embodiment, the viewing device can include a component of the computer 500 of FIG. 8, such as an input/output device 540. In one embodiment, the second hardware module coupled to the viewing device can establish a network connection (e.g., a TCP/IP channel) with the first hardware module coupled to the scanner at a separate physical location. The second hardware module coupled to the viewing device can receive or generate data from the first hardware module to be displayed on the viewing device.

FIG. 1B is a schematic of a remote viewing device 1000 in communication with an image acquisition device 1400 via networked devices as hardware modules, according to one embodiment of the present disclosure. The remote viewing device 1000 can be coupled to a first networked device 1200. The coupling can be, for example, a wired connection to a port in the remote viewing device 1000 or a wireless connection. The first networked device 1200 can receive data, e.g., scan data, and can transmit the data to the remote viewing device 1000 to be rendered and displayed by the remote viewing device 1000. The remote viewing device 1000 can transmit data to the first networked device 1200 to be transmitted over a communication network or channel to which the first networked device 1200 is connected. The image acquisition device 1400 can be coupled to a second networked device 1500. The coupling can be, for example, a wired connection to a port in the remote viewing device 1000 or a wireless connection. The image acquisition device 1400 can transmit data, e.g., acquired scan data, to the second networked device 1500 to be transmitted over a communication network or channel to which the second networked device 1500 is connected. For example, the first networked device 1200 can be connected to the second networked device 1500 via a secure channel, such as a C2 channel. The first networked device 1200 can transmit data from the remote viewing device 1000 to the second networked device 1500, and the second networked device 1500 can transmit the data from the first networked device 1200 to the image acquisition device 1400. In one embodiment, the second networked device 1500 can be configured for network communication with the data store 1300 and can transmit data to the data store 1300. The functions and configurations of the remote viewing device 1000, as described herein, can refer to the remote viewing device 1000 and/or the first networked device 1200 coupled to the remote viewing device 1000. Similarly, the functions and configurations of the image acquisition device 1400, as described herein, can refer to the image acquisition device 1400 and/or the second networked device 1500 coupled to the image acquisition device 1400.

FIG. 1C is a schematic of a remote viewing device 1000 in communication with an image acquisition device 1400 via networked devices as hardware modules and via a third networked device 1600, according to one embodiment of the present disclosure. The remote viewing device 1000 can be coupled to the first networked device 1200, as has been described with reference to FIG. 1B. The image acquisition device 1400 can be coupled to the second networked device 1500, as has been described with reference to FIG. 1B. The first networked device 1200 and the second networked device 1500 can be in network communication with a third networked device 1600. The third networked device 1600 can be a server configured to queue and coordinate data transmissions between the first networked device 1200 and the second networked device 1500. The server 1600 can be, for example, a semaphore server, as will be described in greater detail herein.

In one embodiment, the environment of the present disclosure can include more than one remote viewing device 1000 and more than one image acquisition device 1400. The image acquisition devices 1400 can be located at a first location and can be connected via a shared local network. The remote viewing devices 1000 can be located at a second location separate from the first location. The remote viewing devices 1000 can be organized in clusters, e.g., viewing centers. The remote viewing devices in a viewing center can be connected to the same local network. In one embodiment, a viewing center can be a cluster of remote viewing devices at an airport configured to receive acquired scan data from image acquisition devices at another airport at a separate physical location. In one embodiment, one or more networked devices, such as the networked device 1200, can transmit signals to the remote viewing devices 1000 in the viewing center to control activity of the remote viewing devices 1000. For example, a viewing center can be closed, such that all of the remote viewing devices in the viewing center are disconnected from the image acquisition devices. In one embodiment, an environment can include more than one viewing center. In one embodiment, the present disclosure can provide for multiplexing between the image acquisition devices and the remote viewing devices. For example, an image acquisition device 1400 can transmit data to and receive data from a number of remote viewing devices 1000. The image acquisition device 1400 can select a remote viewing device for data transmission from the number of remote viewing devices based on connection properties and availability, as will be described in further detail herein.

In one embodiment, the more than one remote viewing device and the more than one image acquisition device can be located in the same or a similar physical location, or in the same or a similar geographical location. In one embodiment, remote viewing devices can be located in a number of locations. The number of locations can include a separate physical location from the location of an image acquisition device and the same or similar physical location as the location of an image acquisition device. Similarly, the more than one image acquisition device can be located in a number of locations. The number of locations can include a separate physical location from the location of a remote viewing device and the same or similar physical location as the location of a remote viewing device. For example, an image acquisition device in a first location, e.g., at a first airport, can transmit images to a first remote viewing device at a separate physical location (e.g., a second airport) and to a second remote viewing device in the first location (the first airport). Similarly, a remote viewing device at a first location, e.g., a first airport, can receive images from a first image acquisition device at a separate physical location (e.g., a second airport) and from a second image acquisition device at the first location (the first airport). In this manner, devices that are distributed across a number of locations can still be used effectively for transmission and evaluation of acquired images.

It can be appreciated that a CT scanner is presented herein as a non-limiting example of an image acquisition device, and that additional and alternative image acquisition systems are also compatible with the systems and methods of the present disclosure. The scan data acquired by the image acquisition device are not limited to a specific imaging device, imaging protocol, or imaging data format. The image acquisition device can generate a scan image or set of scan images based on the acquired scan data. The data/file format of the scan images can depend on the type of the image acquisition device. Image formats can be compatible with existing or potential imaging standards, security standards, network standards, etc. The image processing and analysis methods described herein can be applied to scan data including, but not limited to, one or more image slices, raw image files, processed image files, etc.

In one embodiment, a scan acquired by the image acquisition device 1400 can be processed to generate one or more images that can be rendered and analyzed at the remote viewing device 1000. For example, a CT scanner at an airport can use a rotating gantry to acquire X-ray readings of an object (e.g., luggage) from various angles. The X-ray readings can be processed by the scanner to generate tomographic (cross-sectional) images, which can be referred to as slices or image slices of the scanned object. In one non-limiting example, a CT scanner can include a rotating gantry configured to move at approximately 140 rotations per minute (RPM) and can acquire approximately 400-470 image slices for an object. The image slices can be acquired over a number of rotations, e.g., 36 image slices per rotation. In one embodiment, the CT scanner can acquire more than 36 or fewer than 36 image slices per rotation, and speeds of the gantry can vary. A CT scanner or other image acquisition device can also include a non-rotating gantry. The image slices can be appended and compiled in order to generate an image of the interior of the scanned object, or a compiled scan image. In one embodiment, the image acquisition device 1400 can acquire image slices while an object is in the imaging field of the gantry. The image acquisition device 1400 can analyze the image slices acquired in each rotation to determine whether the object is still in the imaging field.

When the object is removed from the imaging field of the gantry, the image acquisition device 1400 can stop collecting image slices and can append the image slices that have been acquired to generate a visualization of the object. In one embodiment, the image can be appended, rendered, and/or analyzed using scan data from one or more types of measurements acquired by the image acquisition device 1400 and corresponding to the image. The data from the one or more types of measurements can be stored in separate files and/or file formats. For example, a CT scanner can acquire image slices of an object based on X-ray readings as well as the nuclear charge (Z effective, or $Z_{eff}$) of the interior of an object. The CT scanner can generate a scan image and a $Z_{eff}$ file corresponding to the scan image based on the acquired image slices. In one embodiment, the image file can be compliant with an existing imaging or transport standard or can be generated without reference to any standards. The scan image can be an image format embodied by one or more files. For example, the image file can be compliant with DICOS (Digital Imaging and Communications in Security) standards. A viewing device (e.g., the remote viewing device 1000) can read both the scan image and the $Z_{eff}$ file in order to generate and/or render the image of the scanned object. The nuclear charge can be displayed in the image using a color scale, wherein each color in the image represents a value or a range of values of nuclear charge within the scanned object from the $Z_{eff}$ file. The image file and any accompanying data files corresponding to the scan image can be used to display the scan image and can be referred to herein as a single image when rendered, e.g., "the CT image," "the first image."

In one embodiment, the scan image can be analyzed using an object detection algorithm to identify the contents of the scanned object. For example, a suitcase can include various items, such as clothing, personal items, office supplies, containers, etc. A suitcase can also include items that are designated as threats or prohibited items, including, but not limited to, physical weapons, explosives, chemicals, liquids, aerosol containers, batteries, etc. The object detection algorithm can be trained for identification of the prohibited items in images and can be executed by the image acquisition device 1400. The object detection algorithm can include, in some examples, a computer vision algorithm or a neural network architecture. The image acquisition device 1400 can use the object detection algorithm to analyze a scan image and identify prohibited items inside of a scanned object. The scan image can be, for example, a CT image rendered using $Z_{eff}$ data. In one embodiment, the image acquisition device 1400 can generate a second image based on the analysis of the CT image. The second image can also be referred to herein as a report image, a threat detection report (TDR), or a detection image. A threat detection report, as referenced herein, can include image data and/or non-image data. For example, a TDR can be an image annotation file, such as a DICOS-standard annotation file. Alternative annotation formats and/or image formats are also compatible for the TDR. The second image can include an indicator of an area of interest in the first image. For example, the second image can include a visualization of anomalies or items detected by the object detection algorithms, such as the prohibited items listed herein. The TDR can include visual elements, such as bounding boxes or colored regions or shapes, at locations of the detected items. The TDR can thus indicate the detected items when the TDR is overlayed onto or otherwise rendered with the scan image. In one embodiment, the size of the TDR file can depend on a number of items that are detected in the first image. For example, if the image acquisition device 1400 does not detect prohibited items in the first image, the TDR can contain header data without additional image data. If the image acquisition device 1400 does detect prohibited items in the first image, the TDR can contain header data as well as image data (e.g., the visual elements) corresponding to the detected prohibited items. In one embodiment, the scan image and the TDR can be rendered as a single image, wherein the TDR is overlayed on or rendered with the scan image such that the detected items are visually distinguished (e.g., highlighted, colored in, circled) in the scan image. The scan image can be rendered and can be inspected or verified at a separate physical location. In one embodiment, the image acquisition device 1400 can write the scan image and the TDR to memory. The image acquisition device 1400 can also compile the images and write the compiled image to disk storage. In a non-limiting embodiment, the scan image can be a CT image, and the TDR can be a CT threat detection report (TDR-CT) generated based on the scan image.

In one embodiment, images generated by the image acquisition device 1400 can be transmitted to a remote device, including the remote viewing device 1000. The transmission of images can be via the second networked device 1500 coupled to the image acquisition device 1400 and the first networked device 1200 coupled to the remote viewing device 1000. The time it takes to transmit an image can depend on the size of the image. It can therefore be advantageous to reduce the size of an image file before transmission to reduce transmission time. For example, lossy and lossless compression algorithms can reduce the size of an image file. However, compressing an image can result in additional processing time before the image is ready to be transmitted, thus counteracting any benefit of reduced transmission time. The effectiveness of image compression in reduction of transmission time can depend on the type of compression and the bandwidth of a given communication protocol or connection between two devices. In one embodiment, the image acquisition device 1400 can compress the scan image for transmission while generating the TDR for a more efficient image preparation process.

Downsampling is a compression method that can decrease the size of an image without affecting image fidelity. The image size can be reduced with or without noticeable visual changes between the original image and the downsampled image. In one embodiment, the image acquisition device 1400 can downsample each acquired image slice by a scale factor, wherein the scale factor is a reduction in area of the image (e.g., a 50% reduction). The image acquisition device 1400 can downsample a scan image by storing a portion of the image rather than the full image. In one embodiment, the portion can be a portion of pixels that are selected according to a sampling rate or pattern (e.g., every other pixel, the top left pixel for each non-overlapping cluster of four pixels, etc.). The downsampled image is reduced in size and can be transmitted to a remote device more quickly than the larger original image. In one embodiment, a remote device receiving the downsampled image can upsample the image (e.g., using area interpolation) in order to restore the image to its original size. The upsampling method can recreate or interpolate the data (e.g., the pixels) that was excluded during downsampling. The scale factor of the downsampling can be set such that the upsampled image is similar to or indistinguishable from the original image.

In some imaging systems, a scanner (e.g., a CT scanner) does not process any scan data until all of the scans for one session (e.g., for an object in the scanner) have been collected. For example, the scanner can continue to acquire scan data (e.g., image slices) until the object is removed from an imaging area of the scanner. The scanner then processes the scan data for the object to generate an output. The output can be, for example, an image based on the collected scans, a conclusion based on the scan data, etc. After the output is generated, the scanner can initiate a next session and can begin collecting scan data for a next object. The scanner can collect scan data in the next session until the next object is removed from the imaging area of the scanner. The scanner can then process the scan data of the next object to generate an output. This pipeline results in processing downtime because the scanner does not process scan data while scanning an object. The scanner waits until all scan data has been acquired before processing the scan data to generate the output. There is inherent idle time when the scanner is not processing scan data while acquiring additional scan data.

In one embodiment, the image acquisition device 1400 can reduce idle time by downsampling scan data (e.g., each image slice) while additional scan data (e.g., additional image slices) is being acquired. For example, a CT scanner can acquire a first image slice of an object (e.g., X-ray data) when the rotating gantry is in a first position. The CT scanner can downsample the first image slice to reduce the size of the first image slice while the rotating gantry moves into a second position and acquires a second image slice of the object. The CT scanner can finish downsampling the first image slice while or after the second image slice is acquired. The CT scanner can then downsample the second image slice to reduce the size of the second image slice while the rotating gantry moves into a third position and acquires a third image slice of the object. Concurrent or parallel downsampling and acquisition of scan data can eliminate the idle time during image slice acquisition. In addition, the parallel downsampling can eliminate the additional processing time that would typically be needed to downsample the image slices after all of the image slices have been acquired. In one embodiment, the image acquisition device 1400 can acquire and downsample the scan data in batches. For example, a CT scanner can collect 36 image slices in one rotation. The rotating gantry can make one full rotation to acquire a first set of 36 image slices. The CT scanner can downsample each of the 36 image slices while the rotating gantry makes a second full rotation to acquire a second set of 36 image slices. The CT scanner can thus complete the processing of sets of 36 image slices before all of the image slices for an object (e.g., the 400-450 image slices as referenced herein, or a different number of image slices) have been acquired. The timing and volume of acquisition and downsampling can be distributed in fixed or variable batches. The image acquisition device 1400 can aggregate the downsampled scan data into a downsampled scan image. For example, the image acquisition device 1400 can append downsampled image slices to create a downsampled scan image. The downsampled image can be transmitted along with any additional files (e.g., the $Z_{eff}$ file) for further processing or rendering. In one embodiment, the additional files do not need to be downsampled because they are smaller than image files and are not a limiting factor in transmission speeds.

In one embodiment, it can be advantageous for the image acquisition device 1400 to execute the object detection algorithm on scan data or a scan image that has not been downsampled to increase accuracy of detection. In some instances, the image acquisition device 1400 can be configured to execute the algorithm locally such that there is no need for transmission of the uncompressed scan image between devices for object detection. In one embodiment, the image acquisition device 1400 can generate a scan image based on scan data that has not been downsampled or otherwise compressed. For example, the image acquisition device 1400 can append unsampled, uncompressed CT image slices to generate a CT scan image. The image acquisition device 1400 can then analyze the full scan image using the object detection method to identify items of interest in the TDR-CT. In one embodiment, the image acquisition device 1400 can append the unsampled image slices to generate the full scan image while also downsampling the image slices for the downsampled image.

For example, a CT scanner can acquire a first set of image slices of an object during a first rotation of the rotating gantry. The CT scanner can then acquire a second set of image slices during a second rotation of the rotating gantry around the object. While the CT scanner is acquiring the second set of image slices, the CT scanner can append together the first set of image slices into a full scan image. The CT scanner can also downsample each slice in the first set of image slices to generate a first set of downsampled slices. The downsampled image slices can be appended together to generate a downsampled digital image. The CT scanner can repeat the appending of unsampled image slices and the downsampling of the image slices until a target number of scans has been acquired to generate the full (unsampled) scan image and the downsampled scan image. The CT scanner can write the downsampled image file to memory (e.g., local memory) and can analyze the full scan image (e.g., using an object detection algorithm) to generate the TDR-CT identifying prohibited items within the contents of the object. The downsampled scan image and the full scan image can be continuously generated by appending new image slices while the CT scanner is acquiring the new image slices.

In one embodiment, the image acquisition device 1400 can perform the acquisition and processing of the image slices using one or more subsystems. For example, in a CT scanner, the rotating gantry can collect raw sensor data. The raw sensor data can be transmitted to a reconstruction computer (RECON) via a fiber optic cable. The RECON can process the raw sensor data to reconstruct scan data for each rotation of the gantry. The RECON can transmit the reconstructed scan data to a scanner communication process (SCP) device, wherein the SCP device can process the reconstructed scan data using the object detection algorithm. The SCP device can store the scan data or scan image in a memory buffer if the object detection algorithm detects a threat or other object of interest. In one embodiment, a hardware module connected to the CT scanner can process the raw sensor data.

In one embodiment, the image acquisition device 1400 can compress one or more images for transmission. Compression can reduce the size of an image file and the transmission time for the compressed image file. The processing time needed to compress a file (compression time) is dependent on the size of the file. In one embodiment, the image acquisition device 1400 can compress a downsampled image file and additional data files (e.g., a $Z_{eff}$ file) corresponding to the image while processing the full scan image using the object detection algorithm to generate the TDR. The parallel processes of compression and image analysis can further reduce the time needed to generate and prepare images for transfer. As an example, a CT scanner can compress an image file using LZ4 compression. According to one example, a CT scanner can compress a downsampled image file from 50 MB to 34 MB and a corresponding $Z_{eff}$ file from 51 MB to 4 MB. Exemplary average compression times can be approximately 268 ms for compression of an image file and 152 ms for a $Z_{eff}$ file. In one embodiment, the image acquisition device 1400 can compress the TDR for transmission. According to one example, the total package size of the image file, accompanying data files, and the TDR after compression can be approximately 42 MB (Megabytes).

Figure 2:
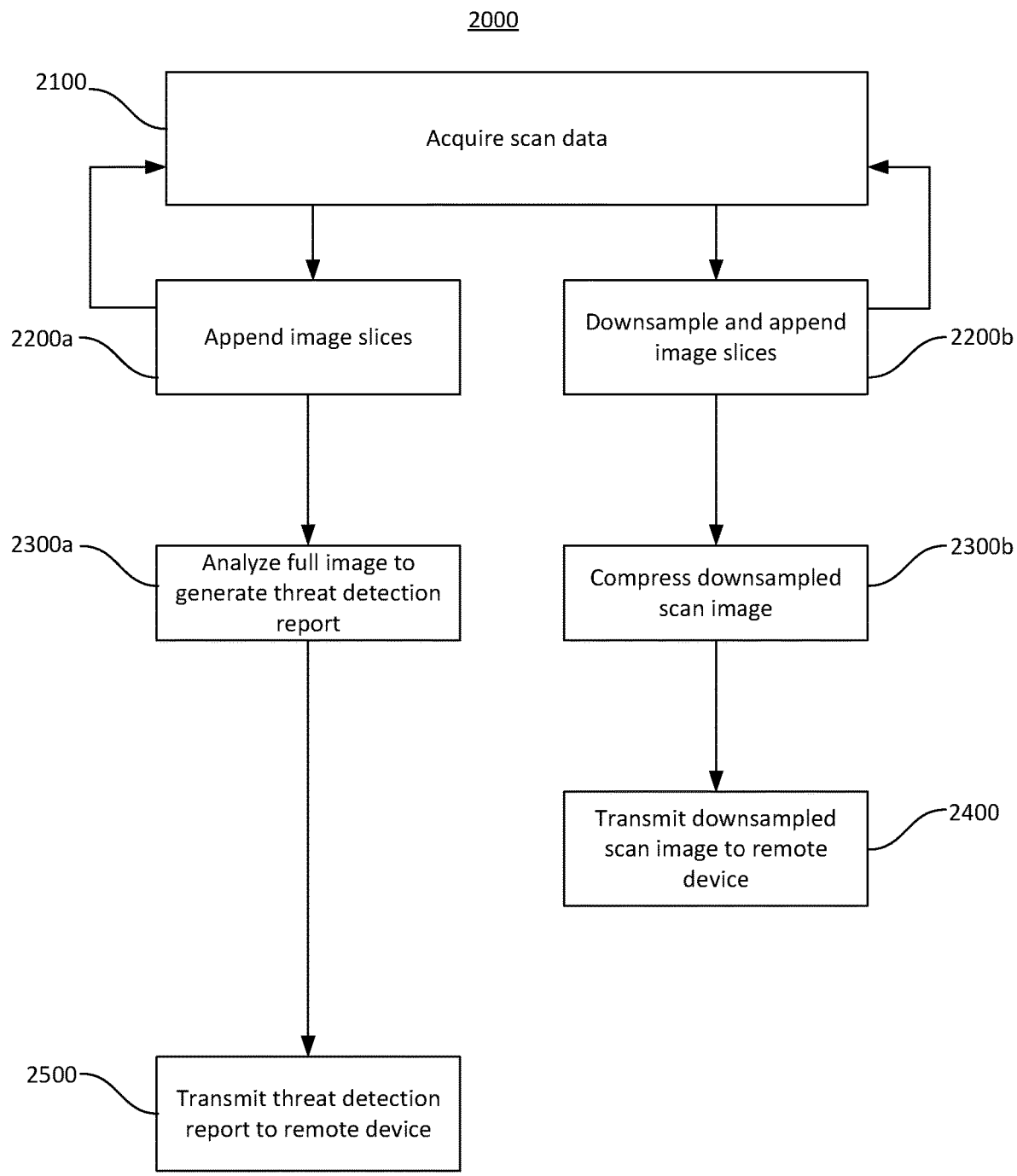
FIG. 2 is a method for acquiring and transmitting scan images, according to an exemplary embodiment of the present disclosure.

FIG. 2 is a method 2000 for generating the scan image and the TDR, according to one embodiment of the present disclosure. In step 2100, the image acquisition device 1400 can acquire scan data by scanning an object. In step 2200*a*, the image acquisition device 1400 can append or aggregate the acquired scan data. For example, the image acquisition device 1400 can be a CT scanner and can append a set of acquired image slices. The appended image slices can form a portion of a full scan image of the object. In step 2200*b*, the image acquisition device 1400 can downsample each image slice in the set and append the downsampled image slices to each other to generate a downsampled image of the object. Step 2200*a* and step 2200*b* can be performed in parallel using the same set of image slices. Notably, steps 2200*a* and 2200*b* can also be performed while the image acquisition device 1400 is acquiring a next set of scan data (e.g., image slices) by scanning the object again. The image acquisition device 1400 can repeat steps 2200*a* and 2200*b* with new sets of scan data as they are acquired until the object is removed from the scanner. After the object is removed from the scanner, the image acquisition device 1400 can save the full scan image and the downsampled scan image. In step 2300*a*, the image acquisition device 1400 can analyze the full scan image generated in step 2200*a* using an object detection algorithm to identify objects of interest and generate a TDR. In step 2300*b*, the image acquisition device 1400 can compress the downsampled scan image for transmission. The image acquisition device 1400 can also compress any additional scan data (e.g., $Z_{eff}$ data) acquired by the scanner for transmission.

In step 2400, the image acquisition device 1400 can initiate transmission of the compressed and downsampled scan image and corresponding data files to a remote device such as the remote viewing device 1000. In step 2500, the image acquisition device 1400 can initiate transmission of the TDR to the remote viewing device 1000. Step 2400 and step 2500 can be sequential in that the image acquisition device 1400 can begin transmitting the compressed and downsampled scan image while the TDR is being generated in step 2300*a*. In many cases, the TDR file can be smaller than the downsampled scan image file because there is less image data in the TDR. The TDR can thus be transmitted more quickly than the downsampled scan image. The image acquisition device 1400 can synchronize the initiation of transmission of steps 2400 and 2500. The transmission initiation point can be a dynamic point in time, wherein the image acquisition device 1400 can calculate an optimal initiation point for transmission of the scan image and the TDR based on factors including, but not limited to, the speed of the object detection algorithm, the size of the image and report files, and network traffic. The image acquisition device 1400 can calculate the optimal initiation point such that the remote viewing device 1000 receives the downsampled scan image and the TDR at the same time. In one embodiment, the image and the TDR can be stored locally, at a coupled network device, and/or in a central data store. For example, the image acquisition device 1400 can transmit the images to the second networked device 1500 in order to initiate transmission of the images to the remote viewing device.

In one embodiment, the image acquisition device 1400 can be a CT scanner, and the scan data acquired by the image acquisition device 1400 in step 2100 can include one or more image slices. The image slices can be appended to generate a complete image of an object. In one embodiment, the method 2000 can be implemented using scan data that does not include one or more image slices. For example, an image acquisition device 1400 can acquire the scan data in a single image of an object rather than over multiple scans or slices. The image acquisition device 1400 can further downsample and/or compress the image to generate a smaller image file for transmission. In one embodiment, the image acquisition device 1400 can generate the smaller image file while analyzing the original image to generate a threat detection report. The parallel processing of the image in the method 2000 can be implemented for various types of scan data and scan images and is not limited to CT scanning.

FIG. 3A through FIG. 3F are schematics of the image acquisition device 1400 and the remote viewing device 1000 (labeled in FIG. 3A as RVD1) during image transmission, according to one embodiment of the present disclosure. As an illustrative example, the image acquisition device 1400 can be a CT scanner for luggage in an airport and the remote viewing device 1000 can be configured to analyze CT scans acquired at the airport to identify prohibited items in the luggage. The airport can include more than one image acquisition device 1400. The remote viewing device 1000 can be one of a number of remote viewing devices in a viewing center (Viewing Center 1) such as an airport at a separate physical location. Additional viewing centers (Viewing Center 2, Viewing Center 3) can also include remote viewing devices in network communication with the image acquisition devices 1400. The remote viewing device 1000 can be in communication with the image acquisition device 1400 via a TCP/IP channel, e.g., a C2 channel.

Figure 3A:
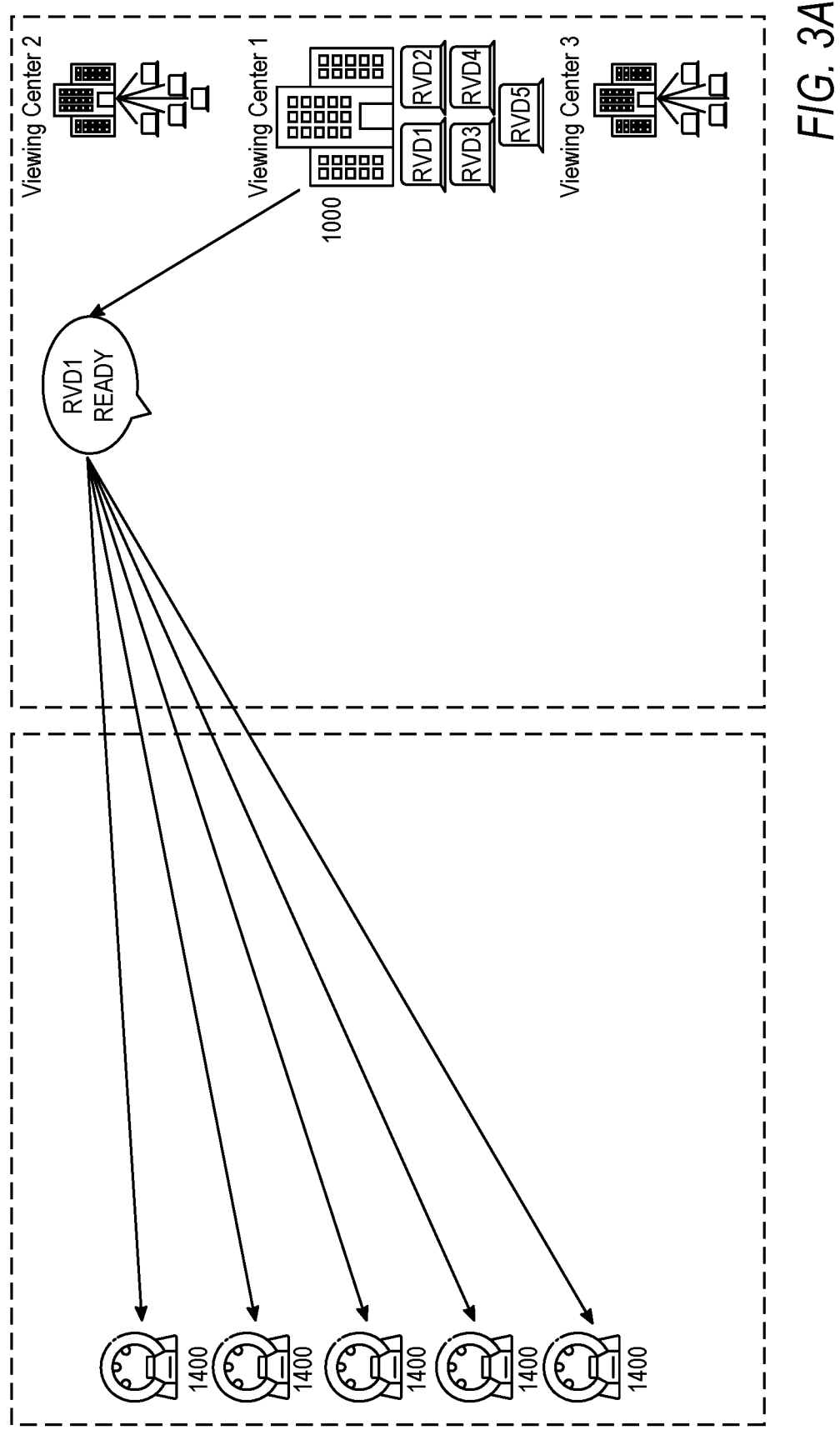
FIG. 3A is a schematic of an image acquisition device in communication with a remote viewing device, according to an exemplary embodiment of the present disclosure.

FIG. 3A is a schematic of an initialization step in image transmission, according to one embodiment of the present disclosure. A remote viewing device 1000 can broadcast an initialization signal (e.g., a first signal) to each image acquisition device 1400 in the airport. The initialization broadcast can indicate that the remote viewing device 1000 is ready ("RVD1 Ready") to receive a scan image for analysis. The initialization broadcast can include a digital signature identifying the remote viewing device 1000, an address of the remote viewing device 1000. In one embodiment, the initialization broadcast can include a time-to-live (TTL), wherein the TTL is a number of seconds that the remote viewing device 1000 is available to receive an image from an image acquisition device 1400. After the TTL has elapsed, the remote viewing device 1000 can broadcast another initialization signal if it has not received a scan image. In one embodiment, the remote viewing device 1000 can transmit the initialization signal directly to an image acquisition device 1400 rather than broadcasting the signal to more than one image acquisition device 1400. The signals transmitted between the devices can indicate states of the devices, as will be described in further detail herein. For example, the initialization signal can include a message, which could be incorporated into a bit flag, indicating a "ready" state of a remote viewing device for receiving a scan image. Each transmission can also include a source address and/or a destination address.

Figure 3B:
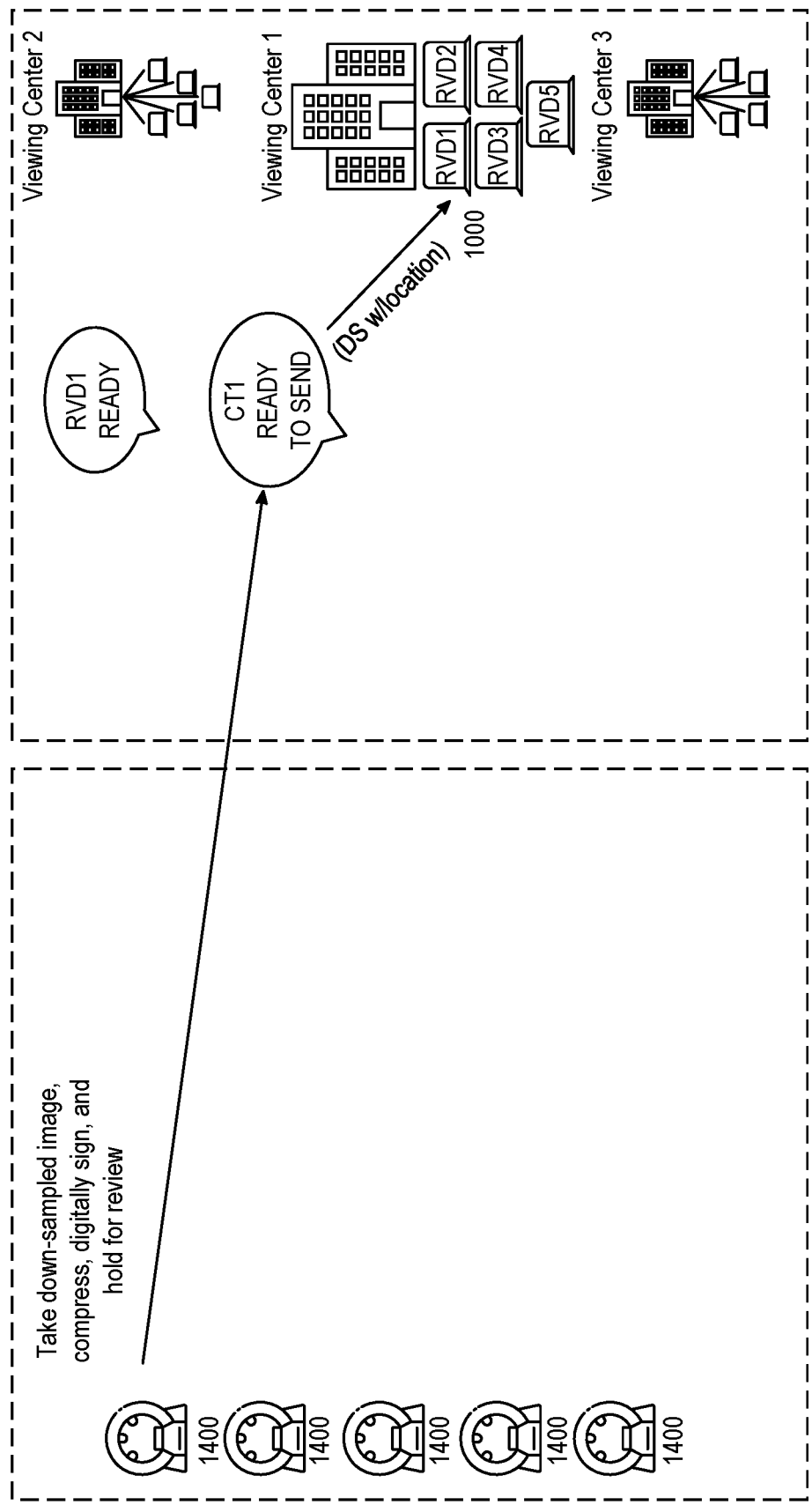
FIG. 3B is a schematic of an image acquisition device in communication with a remote viewing device, according to an exemplary embodiment of the present disclosure.

FIG. 3B is a schematic of a response to the initialization broadcast, according to one embodiment of the present disclosure. In one embodiment, each image acquisition device 1400 can store a local queue of available remote viewing devices 1000 based on the broadcasted initialization (ready) signals. When the image acquisition device 1400 has prepared a scan image and a TDR-CT, the image acquisition device 1400 can select an available remote viewing device 1000 from the queue. In one embodiment, the image acquisition device 1400 can add remote viewing devices to the queue in the order in which initialization broadcasts are received. In one embodiment, the queue can be a first in first out (FIFO) queue. In one embodiment, the image acquisition device 1400 can sort the queue based on the TTL of each initialization broadcast or based on an estimated time that would be needed to send a scan image to each remote viewing device 1000. The queue can be ordered so that the image acquisition device 1400 can select the remote viewing device 1000 with the least latency and/or the highest likelihood of availability for receiving a scan image. For example, the selected remote viewing device 1000 can be a device that is closest to the image acquisition device 1400 in number of hops in the channel. In one embodiment, the image acquisition device 1400 can store or access transmission records associated with a remote viewing device 1000, such as past availability and response times for the remote viewing device 1000 and can order or select a remote viewing device based on the transmission records. In one embodiment, the image acquisition device 1400 can deep-select a remote viewing device from within the queue in order to optimize performance. The queue of available remote viewing devices for each image acquisition device enables the multiplexing of threat scanning across various devices and distances.

The image acquisition device 1400 can transmit a ready-to-send signal (e.g., a second signal, a ready signal, "CT1 Ready to Send") to the selected remote viewing device 1000 indicating that the image acquisition device 1400 is ready to transmit a scan image to the remote viewing device 1000. The ready-to-send signal can include an image hash and a location of the scan image in the image acquisition device 1400. In one embodiment, the image hash can include data about the scan image, such as a time when the image was acquired. The ready-to-send signal can include a digital signature of the image acquisition device 1400. The ready signal can also include a sequence number of the image acquisition device 1400.

Figure 3C:
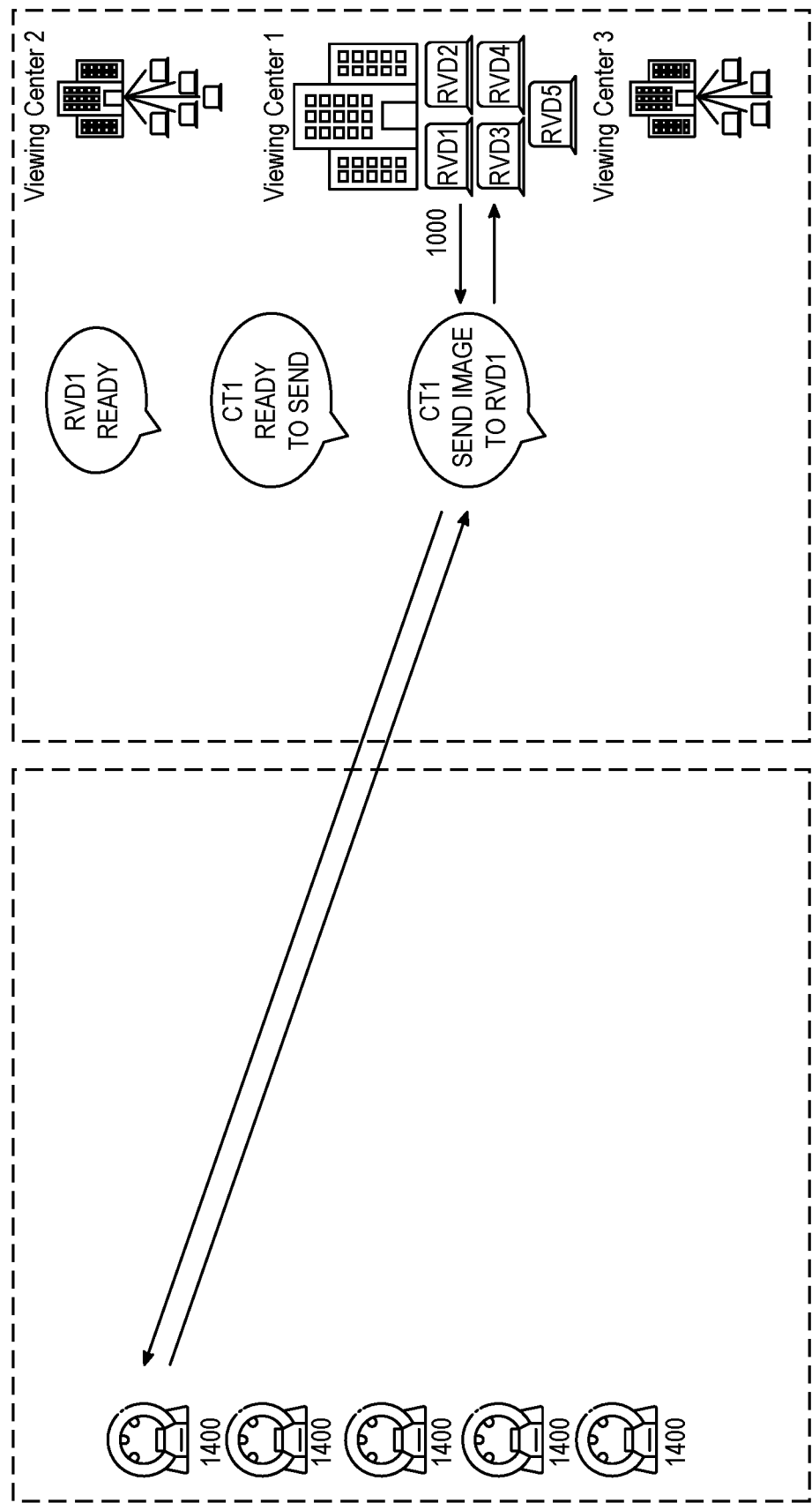
FIG. 3C is a schematic of an image acquisition device in communication with a remote viewing device, according to an exemplary embodiment of the present disclosure.

FIG. 3C is a schematic of the transmission of the scan image and the TDR, according to one embodiment of the present disclosure. The remote viewing device 1000 can request the scan image and the TDR from the image acquisition device 1400 in response to the ready signal from the image acquisition device 1400. In one embodiment, the request from the remote viewing device 1000 can be a confirmation signal (e.g., a third signal) transmitted to the image acquisition device 1400 including identifying information about an active session or a user account on the remote viewing device 1000. The scan image and the subsequent analysis can then be associated with the session or user account. The image acquisition device 1400 can transmit the scan image and the TDR to the remote viewing device 1000. The transmission of the scan image and the TDR can be staggered so that the remote viewing device 1000 receives the scan image and the TDR at the same time, as has been described herein with reference to FIG. 2. If the remote viewing device 1000 does not request the images, the ready signal can time out and the image acquisition device 1400 can select another remote viewing device from the queue.

Figure 3D:
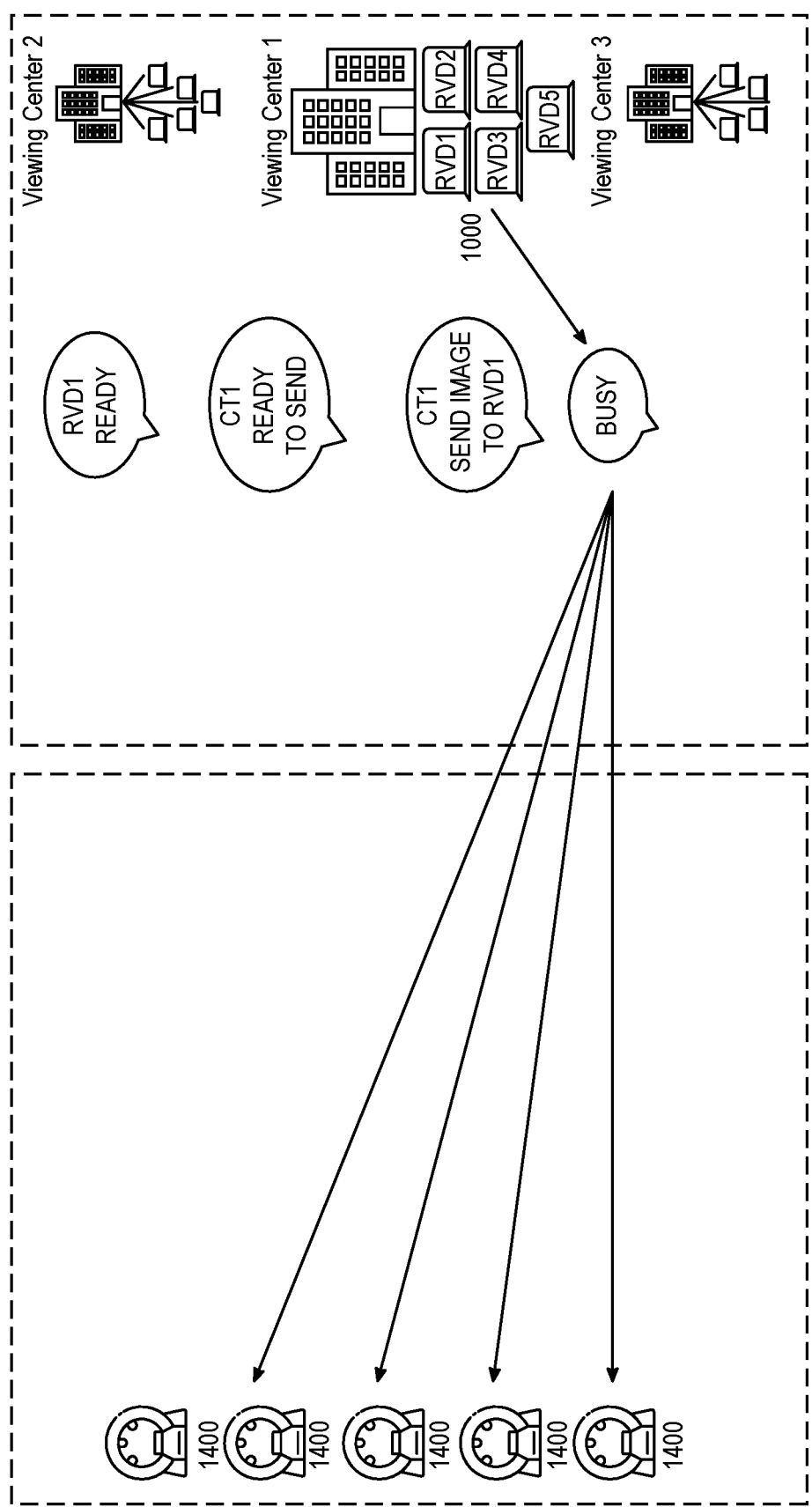
FIG. 3D is a schematic of an image acquisition device in communication with a remote viewing device, according to an exemplary embodiment of the present disclosure.

FIG. 3D is a schematic of a broadcast from the remote viewing device 1000, according to one embodiment of the present disclosure. The remote viewing device 1000 can broadcast a digitally signed signal to the remaining image acquisition devices while or after receiving the scan image. The broadcast can be a fourth signal (a "busy signal" or "busy broadcast") and can indicate that the remote viewing device 1000 is busy or no longer available to receive new scan images. The image acquisition devices 1400 can remove the remote viewing device 1000 from their local queues in response to receiving the busy broadcast. In one embodiment, the remote viewing device 1000 can broadcast the busy signal to the image acquisition device 1400 that is transmitting the scan image so that the image acquisition device 1400 will remove the remote viewing device 1000 from the queue after completing the scan image transmission. The remote viewing device 1000 will not be added to the queues until it sends another initialization broadcast.

The remote viewing device 1000 can receive, render, and display the scan image from the image acquisition device 1400 for further assessment. Rendering and displaying the scan image can include decompressing, upsampling, combining, and/or overlaying the image data. In one embodiment, the remote viewing device 1000 can compile and render a plurality of images as a single image. For example, the remote viewing device 1000 can receive the image file and the $Z_{eff}$ file from the image acquisition device 1400. The image file can include appended image slices, wherein each image slice has been downsampled by the image acquisition device 1400 as described with reference to FIG. 2. The image file and the $Z_{eff}$ file can be compressed by the image acquisition device 1400 prior to transport to the remote viewing device. The remote viewing device 1000 can also receive the TDR from the image acquisition device 1400. The remote viewing device 1000 can decompress the image file and the $Z_{eff}$ file and can upsample the image file. Decompressing and upsampling the image can restore image data that was excluded in order to reduce transmission time. The upsampled image file can be approximately the same size as the originally captured image file or can be a different size. The remote viewing device 1000 can then render the scan image, wherein the data in the $Z_{eff}$ file is used to color or otherwise modify the scan image. The remote viewing device 1000 can overlay the TDR on the scan image such that any objects detected by the object detection algorithm can be highlighted or otherwise visually indicated on the scan image.

Figure 3E:
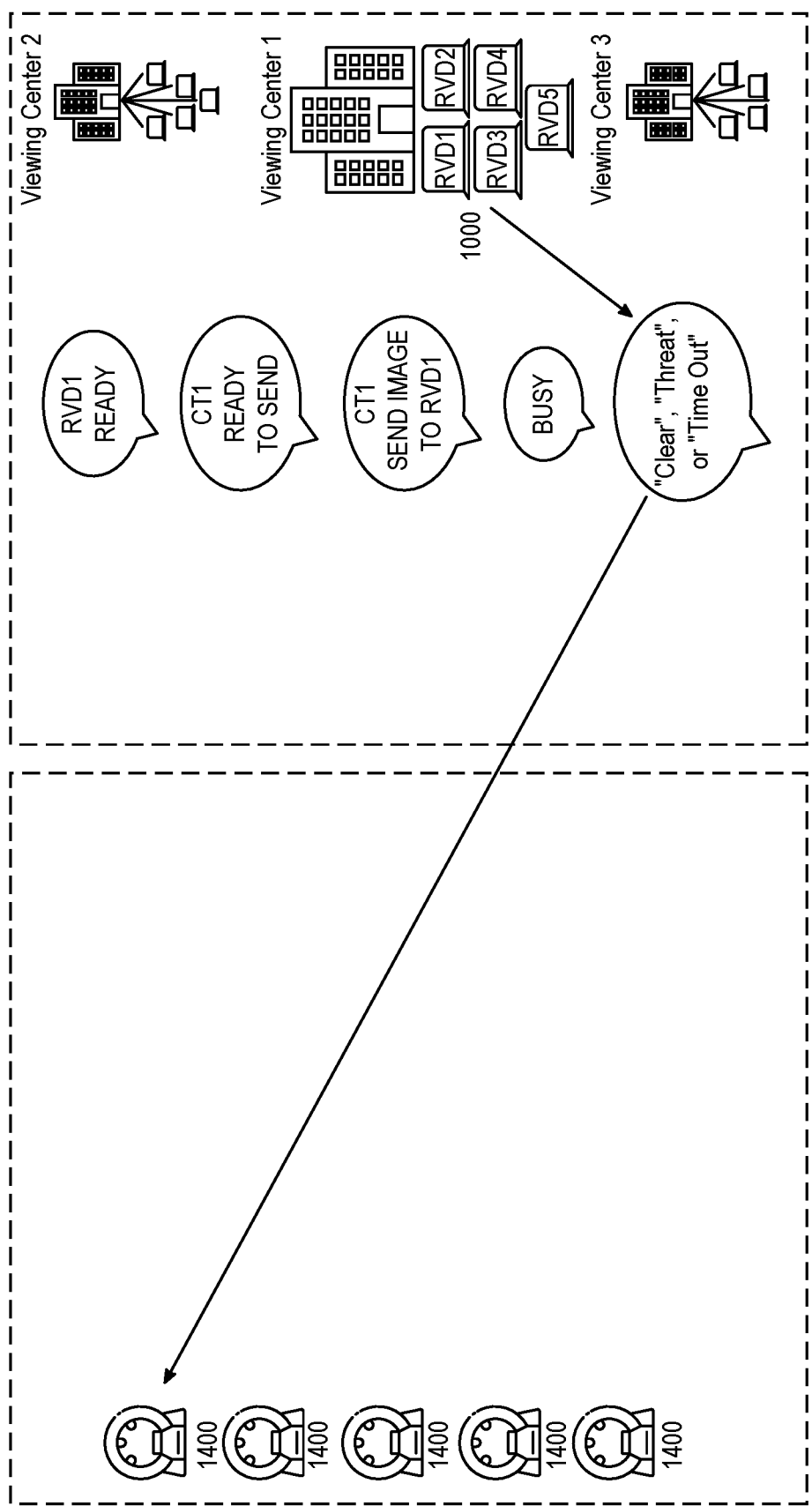
FIG. 3E is a schematic of an image acquisition device in communication with a remote viewing device, according to an exemplary embodiment of the present disclosure.

FIG. 3E is a schematic of a transmission of a response signal (e.g., a threat annotation report) from the remote viewing device 1000 to the image acquisition device 1400. The response signal is transmitted to the image acquisition device 1400 from which the scan image and the TDR were received. In one embodiment, the response signal can include one or more images. In one embodiment, a user (e.g., an image interpretation officer) can view the overlayed scan image and TDR on the remote viewing device 1000. The remote viewing device 1000 can receive an input (e.g., via a user interface) corresponding to the overlayed scan image. The input can be, for example, an assessment or categorization of whether the scan image contains a security threat. The remote viewing device 1000 can generate the response signal based on the input. Additionally or alternatively, the remote viewing device 1000 can assess or categorize the one or more images using an automated method, such as a computer vision algorithm or a neural network trained on assessment data, and can generate the response signal based on the automated assessment.

In one embodiment, the remote viewing device 1000 can generate or modify the scan image or an annotation of the scan image based on the evaluation of the scan image and can transmit the image annotation to the image acquisition device 1400 in the response signal. For example, the remote viewing device 1000 can generate or modify a threat detection report (TDR) for the scan image based on an input to the remote viewing device 1000 from the image interpretation officer. In one embodiment, the remote viewing device 1000 can modify the TDR received from the image acquisition device to include annotations from the image interpretation officer. The TDR generated by the image acquisition device can be an initial threat detection report, and the remote viewing device 1000 can modify the initial TDR based on the input from the image interpretation officer. The modified TDR can be designated herein as a TDR-IO. In one embodiment, the TDR-IO, as used herein, can refer to a new TDR generated by the remote viewing device 1000. The TDR-IO can include annotations to the scan image indicating an identified threat (e.g., prohibited object), including visual elements such as bounding boxes or colored regions or shapes at the location of the identified threat in the scan image. For example, an image interpretation officer can identify a new threat in the scan image that was not identified in the received TDR. The remote viewing device 1000 can generate a visual indicator of the new threat and add the new threat to the TDR to generate the TDR-IO. In one embodiment, the TDR-IO can be based on the items highlighted by visual elements in the TDR. The TDR-IO can include, for example, a "Clear" indication that the scan image does not contain a threat or a "Threat" or "Confirm" indication that the scan image does contain a threat that was identified in the received TDR. In one embodiment, the remote viewing device 1000 can transmit the "Clear" indication to the image acquisition device 1400 with a TDR-IO header or without a TDR-IO if the scan image does not contain a threat. The remote viewing device 1000 can include a digital signature in the TDR-IO. In one embodiment, the digital signature can include information, such as identifying information, about a user of the remote viewing device 1000 during generation of the TDR-IO. The remote viewing device 1000 can transmit the digitally signed TDR-IO to the image acquisition device 1400 via the encrypted TCP/IP channel. In one example, the response signal can include a flag, the flag indicating whether the object in the scan image includes a prohibited item. In one embodiment, the response signal can include data about the analysis of the scan image, such as an elapsed time of assessment or a certainty of threat.

In one embodiment, the image acquisition device 1400 can receive the TDR-IO and can display the TDR-IO along with the scan image and/or the TDR. The TDR-IO can be used to identify objects for further inspection. For example, if the TDR-IO indicates that a scanned bag contains a weapon, the image acquisition device 1400 can display an indication to inspect the scanned bag further. In one embodiment, the TDR-IO can be verified on the image acquisition device 1400. For example, further inspection of an object highlighted in the TDR-IO can be conducted, and the findings of the inspection can be input (e.g., via a user interface) to the image acquisition device 1400. The inspection can confirm the TDR-IO or can dispute the TDR-IO. For example, the image of a weapon identified in the TDR-IO can be confirmed as a true positive, corresponding to a weapon in the luggage, or can be disputed as a false positive, corresponding to an object that is not a weapon in the luggage. In one embodiment, the image acquisition device 1400 can generate a verification signal based on the input and can transmit a verification signal in response to the TDR-IO to the remote viewing device 1000 or to a networked device.

Figure 3F:
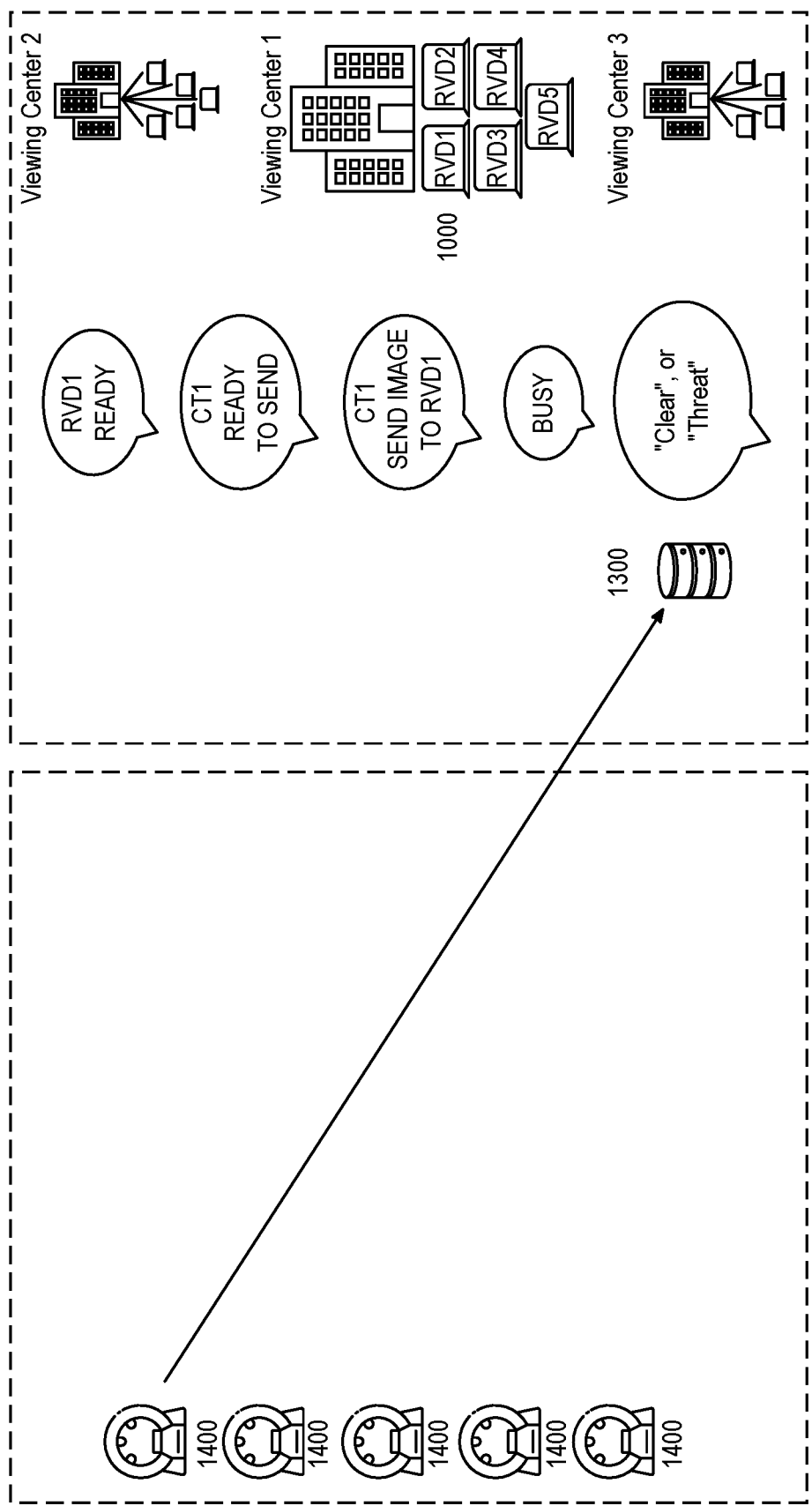
FIG. 3F is a schematic of an image acquisition device in communication with a remote viewing device, according to an exemplary embodiment of the present disclosure.

FIG. 3F is a schematic of a transmission from the image acquisition device 1400 to a data store 1300 hosting a database. The data store 1300 can be, for example, a networked device such as a server. In one embodiment, the image acquisition device 1400 can transmit a verification signal or report to the data store 1300. The verification signal can include the verification of a TDR-IO received by the image acquisition device 1400. The data store 1300 can be a metrics server and can host a database to store metrics data related to the analysis of images. For example, the image acquisition device 1400 can determine an elapsed time for threat detection based on the time between when an image is accessed by a remote viewing device 1000 and when the remote viewing device 1000 transmits a TDR-IO corresponding to the image. According to one example, the database can store key performance indicators (KPIs) related to threat detection. The KPIs can include personnel information such as identifying information about a user who analyzes and/or verifies images generated by an image acquisition device.

In one embodiment, each remote viewing device 1000 and each image acquisition device 1400 can be accessed by one or more users. Each user can be associated with a user account, wherein a user can log into a user account on a remote viewing device 1000 and/or an image acquisition device 1400. In one embodiment, the user accounts can be accessed via login information. In one embodiment, a user account can be accessed with a physical authentication device, such as an access card. Transmissions between the image acquisition device 1400 and the remote viewing device 1000 can be associated with a user account that is active on each device. For example, a remote viewing device 1000 can generate a TDR-IO associated with the active user account, wherein the user account information can be used to track which user authorized the generation and transmission of the TDR-IO. A verification signal from the image acquisition device 1400 in response to the TDR-IO can also include user account information, wherein the user account information can be used to track which user verified the TDR-IO. In one embodiment, the transmissions to and from the image acquisition device 1400 and the remote viewing device 1000 can include the authentication of the end point (the remote viewing device) or user account information.

The metrics server 1300 can store data (e.g., metrics) associated with each user account. In one embodiment, the metrics server 1300 can store records associated with each user account of a remote viewing device 1000 and/or an image acquisition device 1400. For example, a remote viewing device 1000 can receive a number of scan images and transmit a TDR-IO for each scan image to the image acquisition device 1400 based on input from a user. The metrics for each TDR-IO, including, but not limited to, an associated user account, a time it takes to generate the TDR-IO, and an accuracy of assessment, can be transmitted from the image acquisition device 1400 to the metrics server 1300. The metrics server 1300 can identify that each TDR-IO was generated by the same user account. The metrics server 1300 can associate the incoming metrics with existing records for the user account. In one embodiment, the metrics server 1300 can analyze the metrics and calculate aggregate metrics associated with the user account, such as an accuracy over time, a false positive rate, a rate of assessment, or trends in assessment. For example, the metrics server 1300 can store KPIs such as the amount of time it takes for a threat to be detected from a scan image, a number of true positives, a number of false positives, an accuracy, a certainty, etc. The KPIs can be calculated for each user account that is active on the remote viewing device 1000 and/or the image acquisition device 1400. The collection and analysis of the metrics can be used identify weaknesses in the threat detection process and improve threat detection. In one embodiment, the metrics server 1300 can transmit data (e.g., KPI data) to a device in response to a request for data. The device can be, for example, a remote viewing device 1000.

In one embodiment, the remote viewing device 1000 can terminate a session with the image acquisition device 1400 after transmitting the response signal to the image acquisition device 1400. The remote viewing device 1000 can then broadcast the initialization signal to the image acquisition devices 1400 as in FIG. 3A in order to initialize a new process of receiving and assessing a new scan image.

In one embodiment, the remote viewing device 1000 can broadcast an initialization signal for a new scan image before or while generating and transmitting the TDR-IO for a present scan image to a receiving image acquisition device 1400. In one embodiment, there can be a period of latency between requesting a scan image and receiving or displaying the scan image. After generating a TDR-IO for a previous scan image, the remote viewing device 1000 can repeat the processes of broadcasting an initialization signal, receiving a ready signal, receiving a new scan image, and rendering the new scan image. However, these processes can result in idle time, wherein the remote viewing device is no longer displaying the previous scan image for analysis but is still receiving or waiting to receive a new scan image for analysis. In one embodiment of the present disclosure, the latency period can be minimized by receiving a new scan image, rendering the new scan image, and storing the new scan image locally (e.g., in random access memory (RAM) of the remote viewing device 1000) while the remote viewing device 1000 is still displaying and analyzing a present scan image. The remote viewing device 1000 can then immediately display the new scan image that has already been received and rendered after transmitting the TDR-IO for the present scan image.

In one embodiment, the remote viewing device 1000 can broadcast the initialization signal for the new scan image while displaying the present image. A next image acquisition device 1400 can receive the initialization broadcast and can transmit the ready signal to the remote viewing device 1000 followed by the new image. The remote viewing device 1000 can receive the new scan image and render the new scan image while still displaying the present scan image. The next image acquisition device can be a different device from the device transmitting the present scan image being analyzed by the remote viewing device 1000.

In one embodiment, the remote viewing device 1000 can broadcast the initialization signal for the next scan image after displaying the present scan image for a set amount of time. In one embodiment, the timing for the transmission of the initialization signal can be based on an average review time. The average review time can be an average elapsed time between when the remote viewing device 1000 begins displaying an image and when the remote viewing device 1000 transmits the TDR-IO for the image to the image acquisition device 1400. In one embodiment, the remote viewing device 1000 can calculate an average review time for a number of consecutive images (e.g., three images) and can transmit the initialization signal after a portion of the average review time for the present image has elapsed. For example, the remote viewing device 1000 can transmit the initialization signal at time $t = t_{r,\ avg} - 2.5$ after displaying an image, wherein $t_{r,\ avg}$ is an average review time in seconds. The remote viewing device 1000 can then receive a next image in response to the initialization broadcast and can render the next image before completing assessment of the present image.

In one embodiment of the present disclosure, the image acquisition device 1400 and the remote viewing device 1000 can be in direct communication via one or more secure TCP/IP channels, as has been described with reference to FIG. 3A to FIG. 3F. In one embodiment, the image acquisition device 1400 and the remote viewing device 1000 can be in network communication with a networked device 1600, as illustrated in FIG. 1. The networked device 1600 can be, for example, a server. The image acquisition device 1400 and the remote viewing device 1000 can transmit data through the networked device 1600. The networked device 1600 can provide an access point in the networked environment so that the image acquisition device 1400 and the remote viewing device 1000 remain isolated from each other. The networked device 1600 can provide a central communication point for a number of remote viewing devices 1000 organized in a viewing center or for a number of viewing centers, each viewing center including one or more remote viewing devices 1000.

FIG. 4A through FIG. 4E are schematics of the image acquisition device 1400 and the remote viewing device 1000 during image transmission, according to one embodiment of the present disclosure. As an illustrative example, the image acquisition device 1400 can be a CT scanner for luggage in an airport and the remote viewing device 1000 can be used to analyze CT scans acquired at the airport to identify prohibited items in the luggage. In one embodiment, the airport can include more than one image acquisition device 1400 on a shared network and the remote viewing device 1000 can be one of a cluster of remote viewing devices at a viewing center. The remote viewing device 1000 as depicted in FIGS. 4A through 4E can include a remote viewing device coupled to a networked device, such as the first networked device 1200 of FIG. 1B. The remote viewing device 1000 can be in network communication with a server 1600. In one embodiment, the server 1600 can be a semaphore server, wherein the semaphore server 1600 can access images or image locations from the image acquisition devices 1400 and can direct the remote viewing devices 1000 to the image locations. The image acquisition devices 1400 as depicted in FIGS. 4A through 4E can include an image acquisition device coupled to a networked device, such as the second networked device 1500 of FIG. 1B. The images can be stored on the image acquisition device 1400 and/or on a networked device 1500 coupled to the image acquisition device 1400. In one embodiment, the networked device 1500 can access images stored locally on the image acquisition device 1400 in order to transmit the images to another device such as the remote viewing device 1000, a networked device coupled to the remote viewing device 1000, or the server 1600. The semaphore server 1600 can direct each remote viewing device 1000 such that the images from the image acquisition devices 1000 can be analyzed in parallel.

Figure 4A:
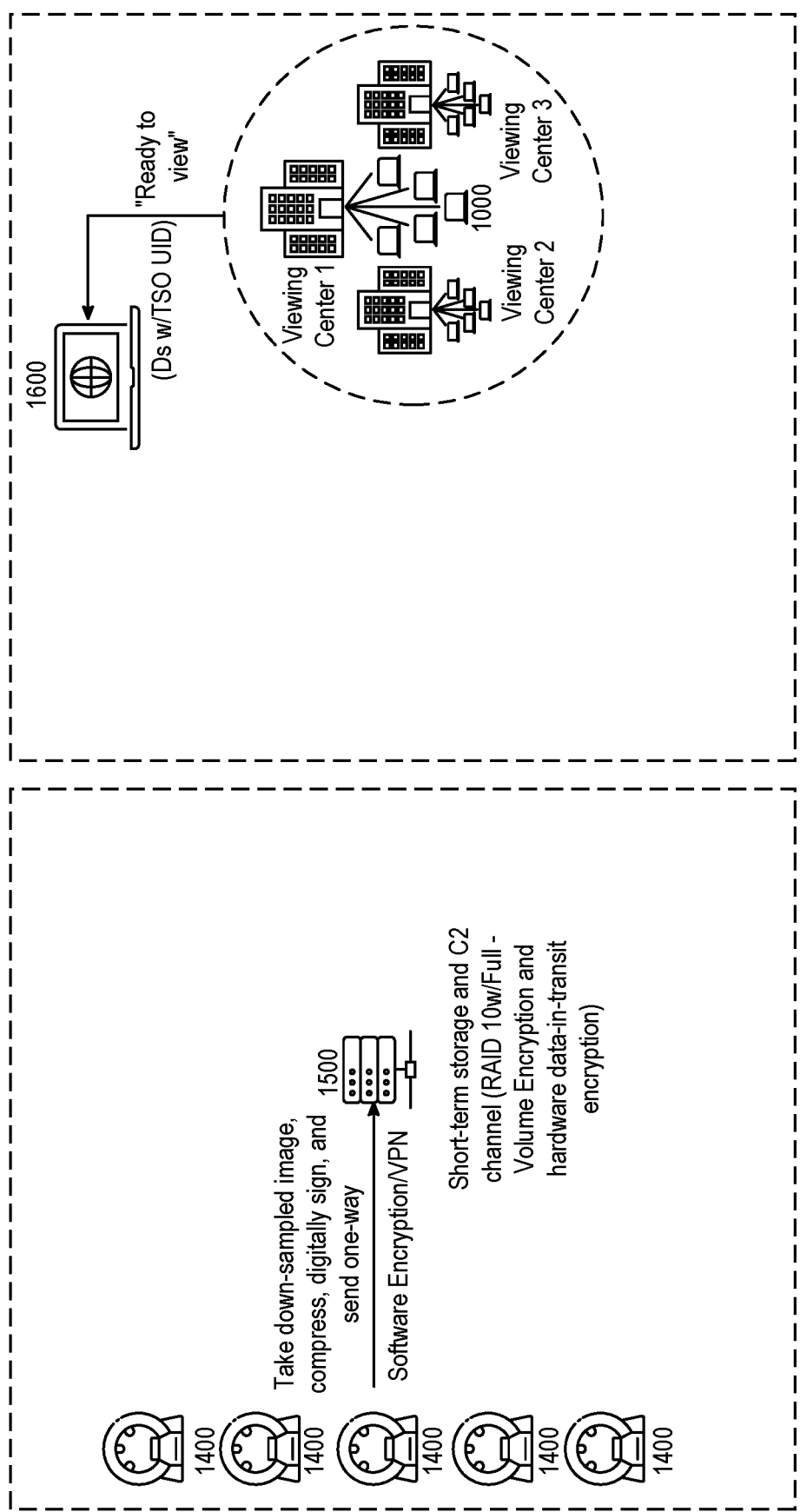
FIG. 4A is a schematic of an image acquisition device and a remote viewing device in communication with networked devices, according to an exemplary embodiment of the present disclosure.

FIG. 4A is a schematic of an initialization step in image transmission, according to one embodiment of the present disclosure. The image acquisition devices 1400 can generate image data. The image data can include, for example, downsampled and compressed images and TDR-CTs. The image data can also include additional data files used to render a scan image. The image acquisition device 1400 can be coupled to a networked device 1500 via a point-to-point connection, e.g., an encrypted software tunnel. In one embodiment, the image acquisition devices 1400 can transmit data to the networked device 1500 via a virtual private network (VPN). The networked device 1500 can be configured for short-term storage and full-volume encryption, as well as hardware data-in-transit encryption. In one embodiment, the networked device 1500 can include a redundant array of independent disks (RAID), wherein the disks are layered in a known configuration (e.g., RAID 10). The transmission of images can include a digital signature wherein the digital signature can be verified by the networked device 1500. In one embodiment, the remote viewing device 1000 can transmit an initialization signal (a first signal) to the semaphore server 1600 indicating that the remote viewing device 1000 has available resources to receive and analyze a scan image. The first signal can include a digital signature of the remote viewing device 1000, wherein the digital signature of the remote viewing device 1000 can be verified by the semaphore server 1600. The semaphore server 1600 can add the remote viewing device 1000 to a queue of available viewing devices stored on the semaphore server 1600. The queue can be, in one example, a first in first out (FIFO) queue.

Figure 4B:
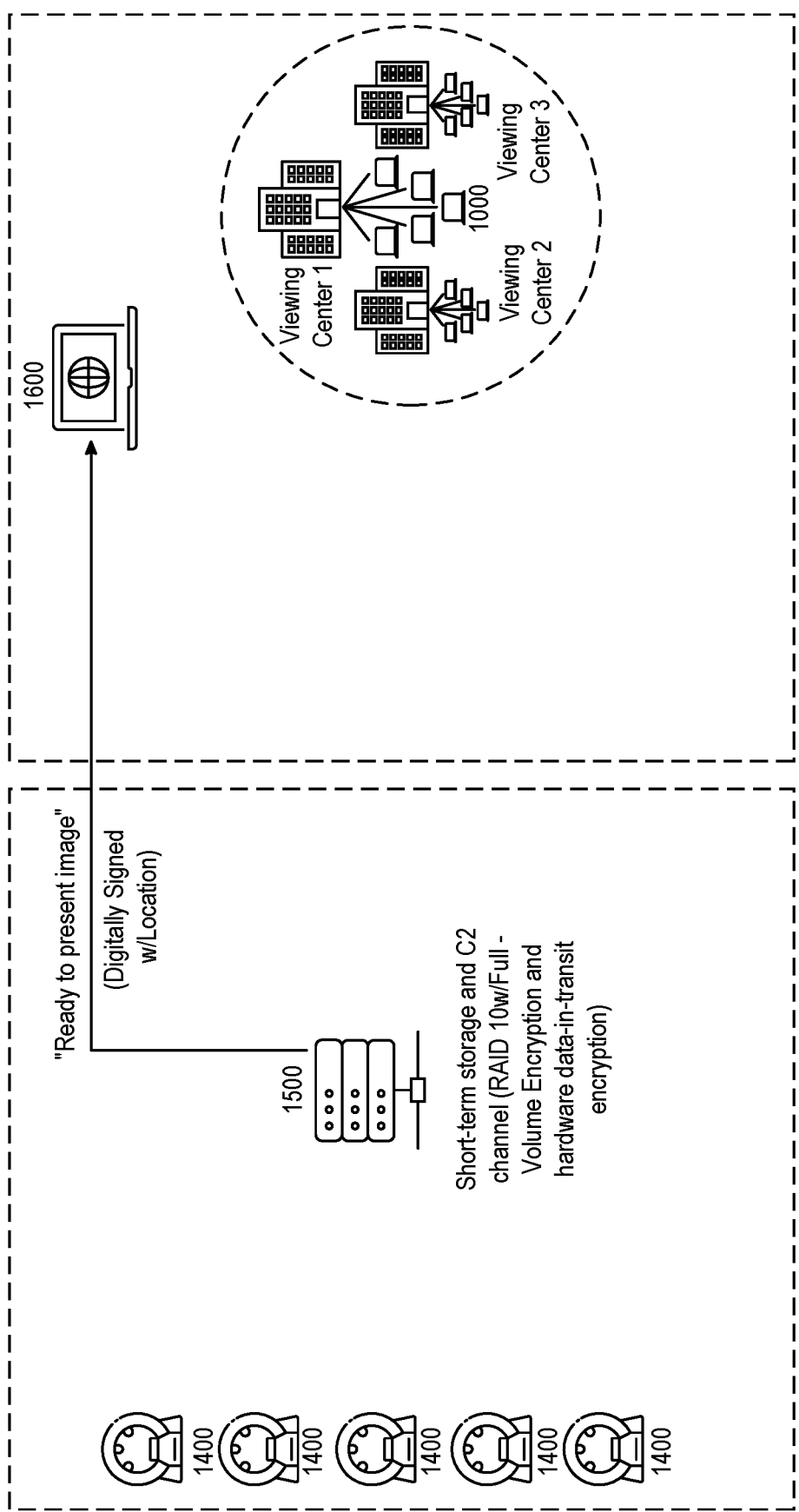
FIG. 4B is a schematic of an image acquisition device and a remote viewing device in communication with networked devices, according to an exemplary embodiment of the present disclosure.

FIG. 4B is a schematic of a communication between the semaphore server 1600 and the networked device 1500, according to one embodiment of the present disclosure. The semaphore server 1600 can store or access a queue of available remote viewing devices 1000 based on initialization signals transmitted from the remote viewing devices 1000 to the semaphore server 1600. The networked device 1500 can transmit a signal to the semaphore server 1200 indicating the location of one or more images in the networked device 1500 or the image acquisition device 1400 to be analyzed. The signal can include, for example, a digitally signed packet wherein the packet payload includes the location of the one or more images. The semaphore server 1600 can verify the digital signature. In one embodiment, the networked device 1500 can transmit the signal to the semaphore server 1600 when a new image is added to the networked device 1500 by the image acquisition device 1400. In one embodiment, the semaphore server 1600 can store a second queue of image locations. The semaphore server 1600 can match an available remote viewing device 1000 from the first queue with an image from a networked device 1500 in the second queue. The networked device can be one of a number of networked devices, each coupled to a different image acquisition device. The implementation of queues can ensure that images are analyzed in the order that they are acquired and/or stored and can minimize idle time of an available remote viewing device. In one embodiment, the ordering of the queue can be based on a network distance between the remote viewing device 1000 and the networked device 1500, as described with reference to FIG. 3B.

Figure 4C:
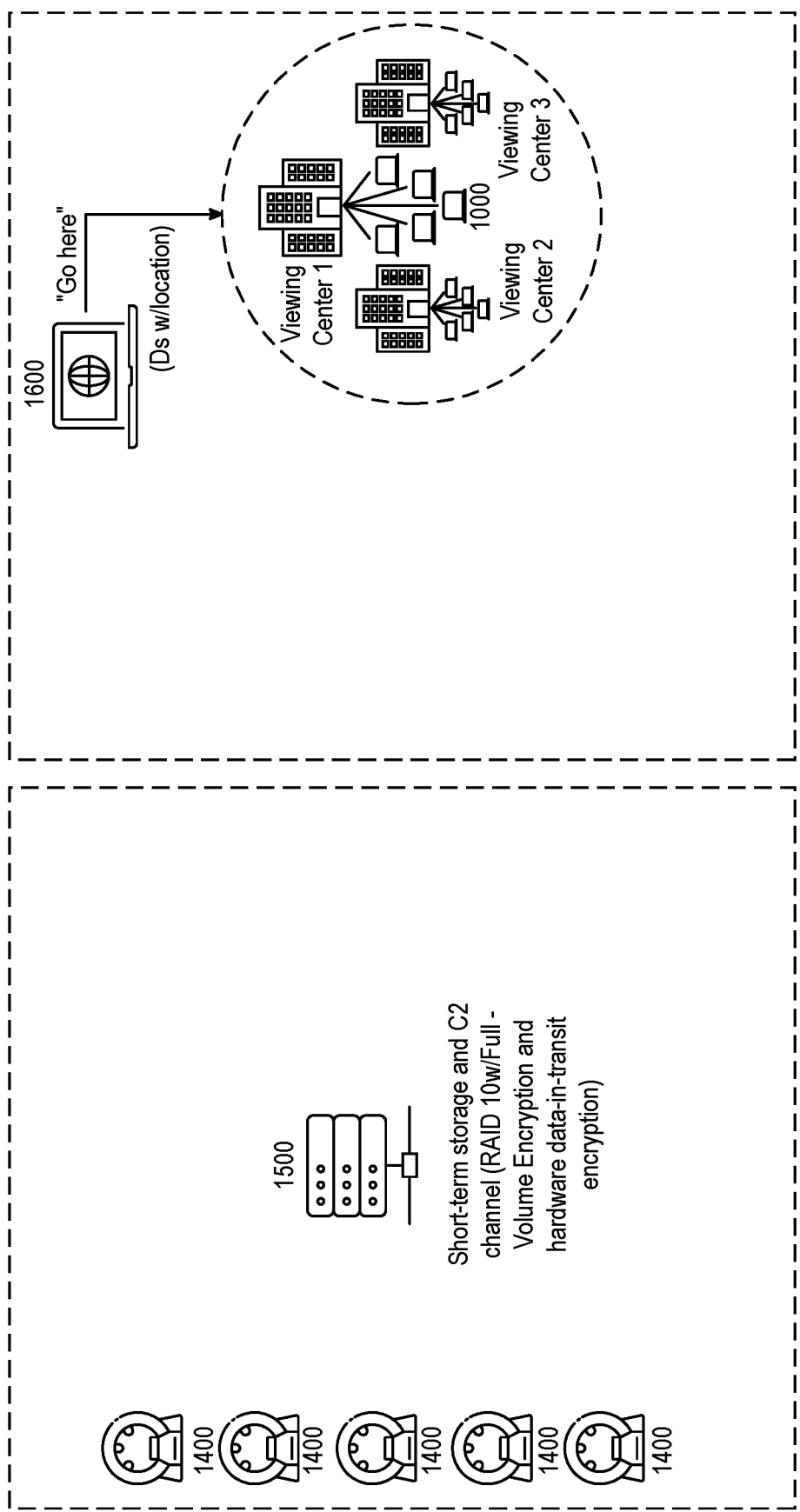
FIG. 4C is a schematic of an image acquisition device and a remote viewing device in communication with networked devices, according to an exemplary embodiment of the present disclosure.

FIG. 4C is a schematic of a communication between the semaphore server 1600 and the remote viewing device 1000, according to one embodiment of the present disclosure. The semaphore server 1600 can transmit a digitally signed signal to the remote viewing device 1000, wherein the signal (e.g., a second signal) includes a location of one or more images for inspection. The location can be an address in the memory of the networked device 1500 or the image acquisition device 1400. The remote viewing device 1000 can verify the digital signature and can access the memory location. In one embodiment, the semaphore server 1600 can transmit the location to the remote viewing device 1000 without directly receiving or transmitting the image data. In this manner, access to images can be limited to the image acquisition devices and the remote viewing devices. The semaphore server 1600 can thus host additional services without comprising the security of the images. In one embodiment, the semaphore server 1600 can receive the one or more images from the networked device 1500 and can transmit the one or more images directly to the remote viewing device 1000.

Figure 4D:
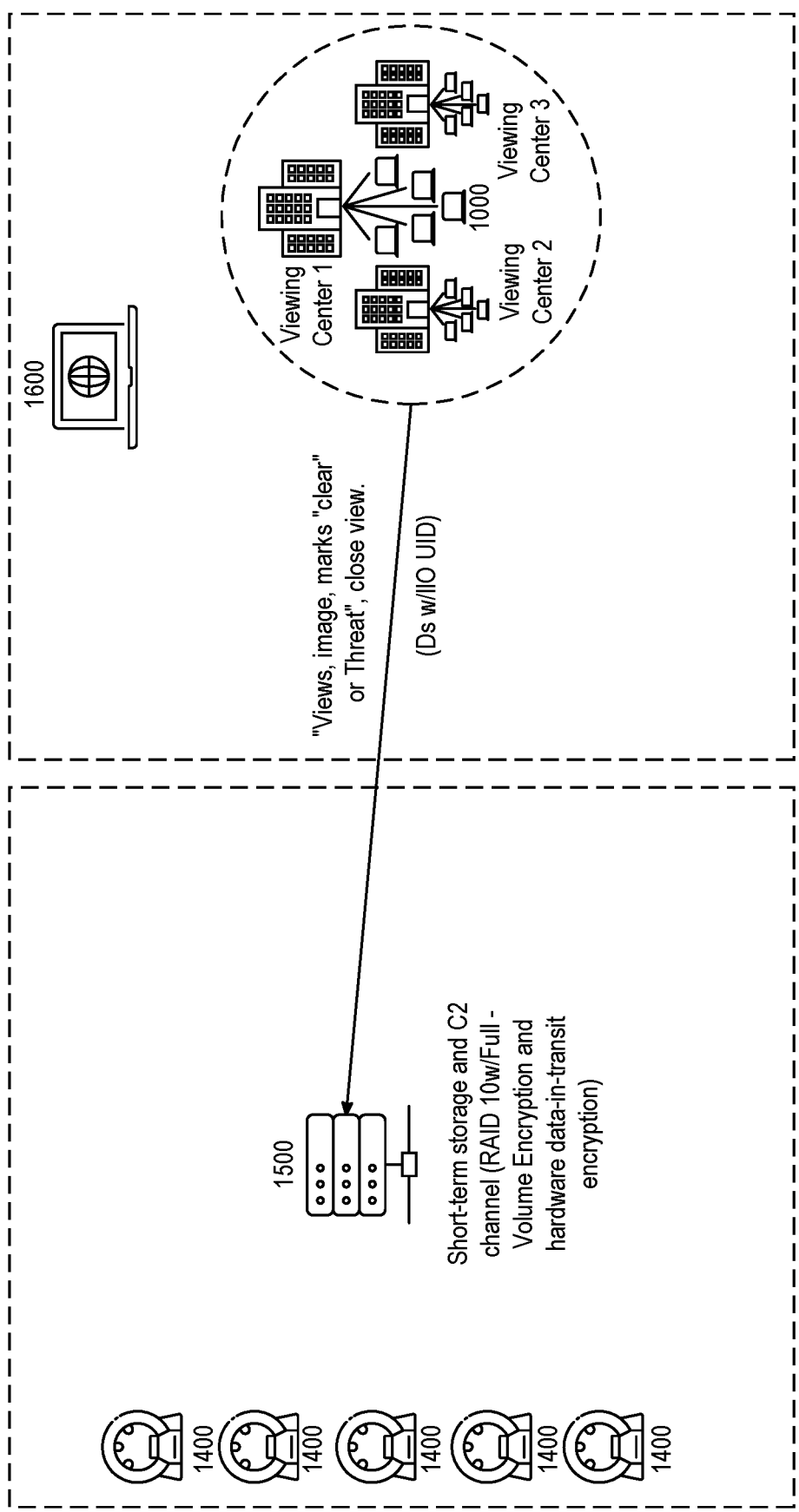
FIG. 4D is a schematic of an image acquisition device and a remote viewing device in communication with networked devices, according to an exemplary embodiment of the present disclosure.

FIG. 4D is a schematic of the remote viewing device 1000 accessing the networked device 1500, according to one embodiment of the present disclosure. The remote viewing device 1000 can access the networked device 1500 via a TCP/IP channel (e.g., a C2) channel. The remote viewing device 1000 can access the location in the networked device 1500 that was received in the second signal of FIG. 4C and extract (receive) the one or more images stored at the location. The one or more images can include, for example, a scan image and a TDR. The transmission of the data from the data store location can be encrypted (e.g., via hardware data-in-transit encryption) so that it cannot be intercepted before being received by the remote viewing device 1000. The remote viewing device 1000 can render and display the one or more images received from the networked device 1500. Rendering and displaying the one or more images can include decompressing, upsampling, combining, and/or overlaying the image data, as has been described herein with reference to FIG. 3D. In one embodiment, the remote viewing device can compile and render a plurality of images as a single image, e.g., an overlayed image.

In one embodiment, the remote viewing device 1000 can transmit a status signal to the semaphore server 1600 while the remote viewing device 1000 is displaying a scan image for analysis. For example, the status signal can indicate that the remote viewing device 1000 is not available for a new scan image in the queue of the semaphore server 1600. The semaphore server 1600 can exclude the remote viewing device 1000 from the queue of available devices upon receiving the status signal. In one embodiment, the remote viewing device 1000 can transmit the status signal to the semaphore server 1600 in response to receiving a second signal (e.g., a ready-to-send signal) from the semaphore server 1600.

In one embodiment, the remote viewing device 1000 can generate a response signal, e.g., a TDR-IO, based on an analysis of the scan image and can transmit the response signal to the networked device 1500. For example, the remote viewing device 1000 can generate annotations of the scan image in the networked device 1500 in the TDR-IO and can write the TDR-IO or the annotated scan image as a new data file in the networked device 1500. The remote viewing device 1000 can generate a digital signature as part of the TDR-IO. In one embodiment, the digital signature can include information, such as identifying information, about a user of the remote viewing device 1000.

Figure 4E:
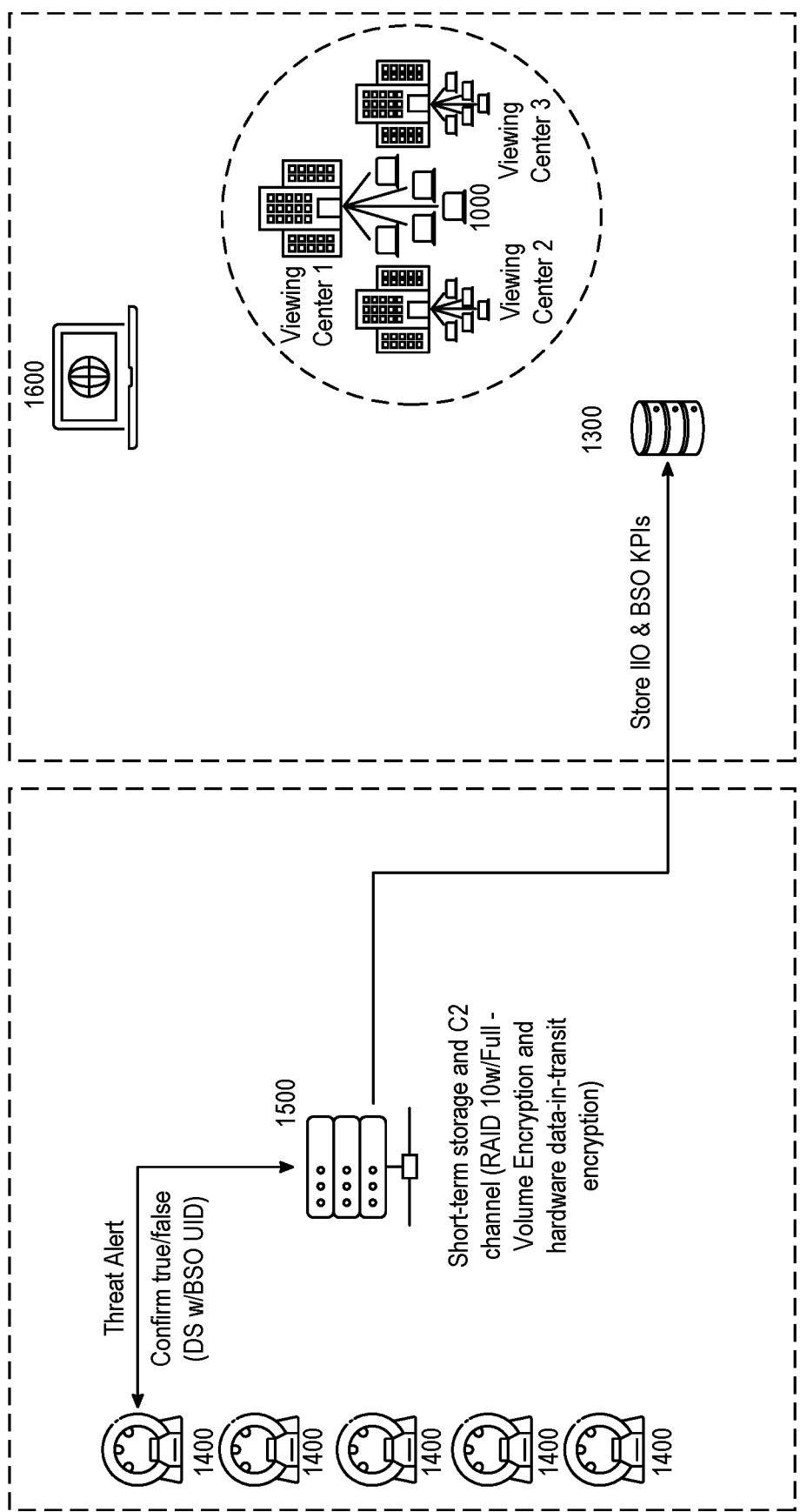
FIG. 4E is a schematic of an image acquisition device and a remote viewing device in communication with networked devices, according to an exemplary embodiment of the present disclosure.

FIG. 4E is a schematic of communication between the networked device 1500 and the image acquisition device 1400, according to one embodiment of the present disclosure. The remote viewing device 1000 can write the TDR-IO to the networked device 1500 to indicate whether an object in an image contains a security threat, as in FIG. 4D. The image of the object can include data regarding the origins of the image. For example, the data can include a location, designation, number, or other identifying feature of an image acquisition device. In one embodiment, the networked device 1500 can transmit a digitally signed threat alert to the image acquisition device 1400 that acquired the image based on the TDR-IO from the remote viewing device 1000. For example, the threat alert can include an indication that the object contains a security threat according to the TDR-IO. In one embodiment, the networked device 1500 can inspect the TDR-IO in order to generate the threat alert. The image acquisition device 1400 can receive the threat alert and/or the TDR-IO and can generate a verification signal and transmit the verification signal to the networked device 1500 in response to the threat alert and/or the TDR-IO. In one embodiment, the verification signal can include a verification of the threat indicated in the TDR-IO. For example, the verification signal can include a confirmation that the threat indicated in the TDR-IO exists in the contents of the object. In one example, the verification signal can indicate that the identified threat in the TDR-IO is a true positive or a false positive. The verification signal can be based on an input into the image acquisition device 1400 (e.g., via a user interface) and transmitted to the networked device 1500. The verification signal transmitted by the image acquisition device 1400 can be digitally signed.

In one embodiment, the networked device 1500 can transmit a metrics signal to the metrics server 1300 based on the verification signal received from the image acquisition device 1400, as illustrated in FIG. 4E. The metrics can be extracted by the networked device 1500 and/or the image acquisition device 1400. For example, the networked device 1500 can determine an elapsed time for threat detection based on the time between when an image is accessed by a remote viewing device 1000 and when the remote viewing device 1000 transmits a TDR-IO based on the image. The networked device 1500 can transmit the metrics signal including one or more KPIs to the metrics server 1300 after each scan image is analyzed and the verification signal is received by the networked device 1500. The metrics server 1300 can store the KPIs and additional or alternative metrics and can analyze metrics corresponding to a user account.

In one embodiment, the remote viewing device 1000 can terminate communication with the networked device 1500 after transmitting a TDR-IO to the networked device 1500. The remote viewing device 1000 can then send an initialization signal to the semaphore server 1600 indicating that the remote viewing device 1000 is available to extract a new image for assessment. The semaphore server 1600 can then add the remote viewing device 1000 to a queue of remote viewing devices that are available to process images. In one embodiment, the remote viewing device 1000 can write the rendered and displayed image to a short-term data store (not illustrated).

In one embodiment, the remote viewing device 1000 can transmit an initialization signal to the semaphore server 1600 before or while generating and transmitting the TDR-IO for a present image. There can be a period of latency between images while the remote viewing device 1000 accesses a networked device 1500 to extract a new image and render the new image for display. The transmission and rendering time can be idle time wherein the new image is not ready for analysis. In one embodiment, the latency period can be minimized by extracting the new image from the data store, rendering the new image, and storing the new image locally (e.g., in RAM of the remote viewing device 1000) while the remote viewing device 1000 is still displaying and analyzing the present image. The remote viewing device 1000 can then immediately display the new image after transmitting the TDR-IO for the present image to the data store. The remote viewing device 1000 can transmit the initialization signal for the next image to the semaphore server 1600 after displaying the present image for a set amount of time.

In one embodiment, the timing for the transmission of the initialization signal can be based on an average review time. The average review time can be the time between when the remote viewing device 1000 begins displaying an image and when the remote viewing device 1000 transmits the TDR for the image to the networked device 1500. In one embodiment, the remote viewing device 1000 can calculate an average review time for a number of consecutive images (e.g., three images) and can transmit the initialization signal after a portion of the average review time for the present image has elapsed. For example, the remote viewing device 1000 can transmit the initialization signal at time $t=t_{r, avg}-2.5$, wherein $t_{r, avg}$ is an average review time in seconds. The remote viewing device 1000 can then receive an address of a next image and can retrieve and render the next image before completing review and analysis of the present image.

In one embodiment, each remote viewing device 1000 and each image acquisition device 1400, or networked devices coupled therewith, can encrypt and decrypt transmissions to ensure the integrity and security of signals transmitted between the devices and any networked devices. The encryption can include, for example, asymmetric cryptography methods. In one embodiment, symmetric cryptography (e.g., private-key encryption) can be implemented. Additionally or alternatively, devices sending and/or receiving transmissions can authenticate the identity of a transmitting device based on data included in the transmissions. For example, data transmissions between the remote viewing devices 1000 and the image acquisition devices 1400 can include a digital signature. The digital signature can be a hash that is encrypted with a private key. In one embodiment, the private key can be associated with a user account. In one embodiment, each device (e.g., each remote viewing device 1000, each image acquisition device 1400) can store a private key in a hardware storage module (HSM). The devices can receive public keys for each device from a networked device, such as a public key server. The public key server can validate and maintain public keys for all devices. In one embodiment, the public and/or private keys can be valid for a set period of time, e.g., 24 hours. A device can receive a new public key from the public key server after the 24 hours has elapsed. A receiving device can use the public key of a transmitting device, which the receiving device has received from the public key server, to decrypt the digital signature of the signal from the transmitting device. The receiving device can then verify that the digital signature matches the transmission and can extract information from the digital signature, such as an associated user account or a timestamp. It can be appreciated that the use of digital signatures is presented herein as one method of encryption and authentication, and that alternative or additional cryptography schemes and data security methods are also compatible with the present disclosure.

In one embodiment, each remote viewing device 1000 and image acquisition device 1400 can receive a digital certificate with a set validity period. The validity period can be, for example, 24 to 30 hours. The remote viewing device 1000 can receive the digital certificate from a networked device, e.g., the semaphore server 1600 or a separate networked device. In one embodiment, a remote viewing device 1000 can use the digital certificate to validate a public key for decoding a transmission. In one embodiment, the remote viewing device 1000 or the image acquisition device 1400 can present a digital certificate to prove that the device is an intended destination for a transmission. In one embodiment, when a transmission security measure fails, the recipient device (e.g., the remote viewing device 1000 or the image acquisition device 1400) can generate an alert. The transmission can be allowed to continue but can be flagged by the recipient device due to a failure to authenticate or verify the transmission. In one embodiment, further action such as manual verification and input to the recipient device can be performed in response to the flagging of the transmission.

Figure 5:
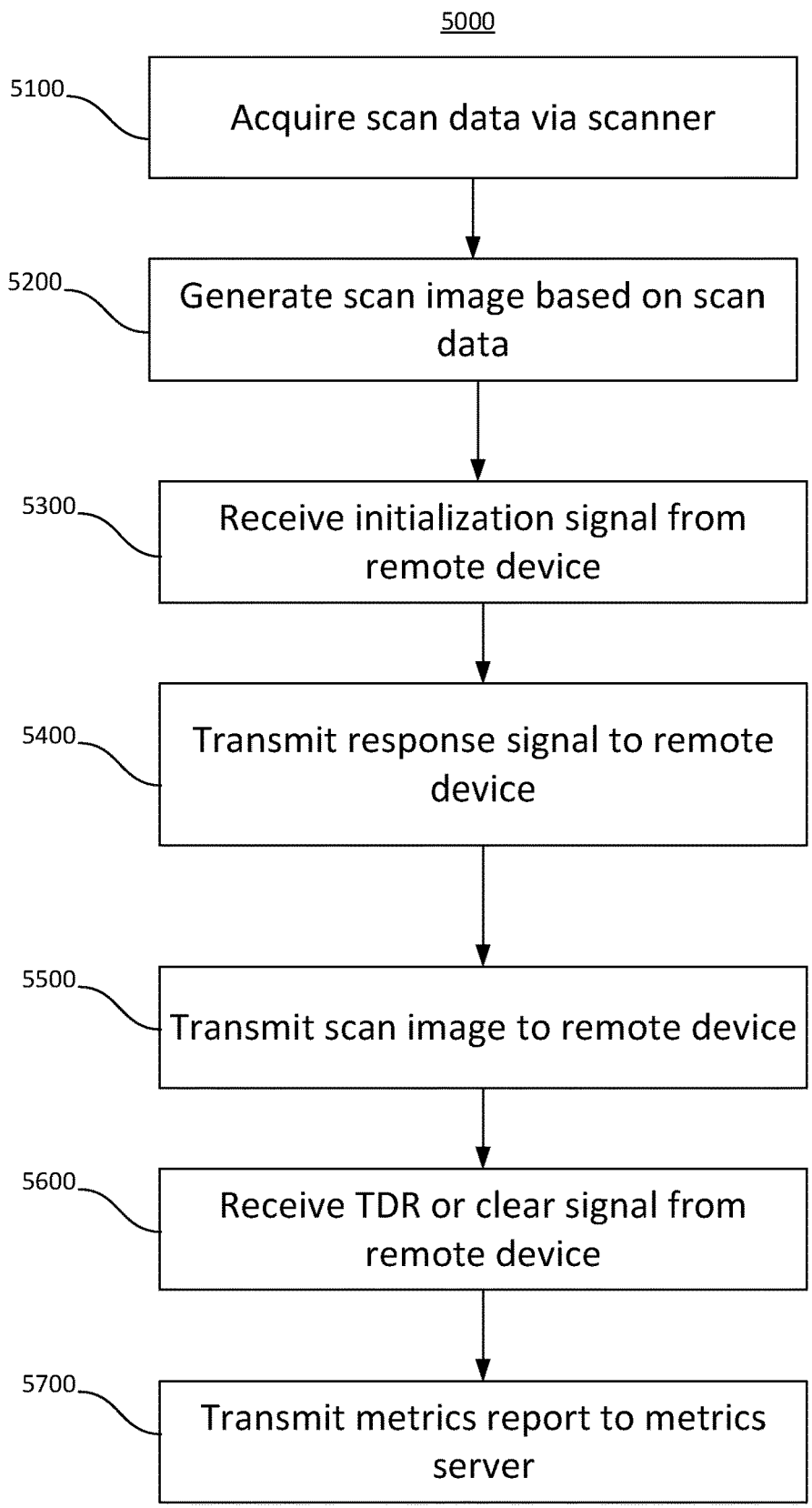
FIG. 5 is a method of transmitting images to a remote device, according to an exemplary embodiment of the present disclosure.

FIG. 5 is a method 5000 for acquiring and transmitting a scan image or a set of scan images to a remote device for analysis, according to one embodiment of the present disclosure. In one embodiment, the method 5000 can be performed by the image acquisition device 1400 and/or a networked device 1500 coupled to the image acquisition device 1400. For example, the steps of the method 5000 can be distributed across the image acquisition device 1400 and the networked device 1500. The remote device can be the remote viewing device 1000 and can be coupled to a first networked device 1200. In one embodiment, the remote device can include more than one remote device. For example, the remote device can include a plurality of remote viewing devices 1000. The image acquisition device 1400 can be in networked communication with the remote device, e.g., via a TCP/IP channel.

The image acquisition device 1400 can acquire scan data by imaging an object in step 5100. The scan data can include, but is not limited to, an image slice or an image of the object. The image slice can include a plurality of image slices. In one embodiment, the image slice can be a CT image slice. In one example, the scan data can be acquired by a camera. The image acquisition device 1400 can generate a scan image or set of scan images based on the scan data in step 5200. The image acquisition device 1400 can generate the scan image in step 5200 by processing scan data from a scanner or image sensor. The scan images can include, for example, a 3D or 2D rendering of the object. The image acquisition device 1400 can generate a TDR based on the scan image or set of scan images in step 5200 by analyzing the scan image using an object detection algorithm. The scan image and TDR can be associated with each other and/or can be stored in a location in memory. In one embodiment, the following steps in the method 5000 can be executed in parallel with continuous acquisition of scan data and generation of scan images in steps 5100 and 5200.

In one embodiment, the image acquisition device 1400 can receive a first signal, e.g., an initialization signal, from a remote viewing device 1000 in step 5300. The initialization signal can be a broadcast to more than one image acquisition device 1400. The image acquisition device 1400 can add the remote viewing device to a local queue stored on or accessed by the image acquisition device 1400. When the image acquisition device 1400 has generated the image or set of images for analysis, the image acquisition device 1400 can select the remote viewing device 1000 from the local queue and can transmit a response to the selected remote viewing device 1000 in step 5400. The response can include, for example, a location of the scan image or set of scan images in memory.

The image acquisition device 1400 can transmit the scan image or set of scan images to the selected remote viewing device 1000 in step 5500. Images and reports can be transmitted asynchronously, as has been described herein, in order to reduce latency or idle time while the remote viewing device is receiving the images. The remote viewing device can render and display the images for further analysis. In step 5600, the image acquisition device 1400 can receive a report image, e.g., a TDR annotation, from the remote viewing device 1000 in response to the scan images. The TDR can include, for example, information about a scan image, such as a presence or absence of an object of interest and other evaluation of the scan image. The image acquisition device 1400 can verify the TDR. In step 5700, the image acquisition device 1400 can transmit a metrics report, e.g., a metrics signal, to a metrics server based on the TDR. The metrics report can include, for example, a determination of whether the TDR includes a false positive or a false negative. The metrics report can include an elapsed time between when the scan images were transmitted to the remote viewing device 1000 and when the image acquisition device 1400 received the reporting image in response to the scan images.

Figure 6:
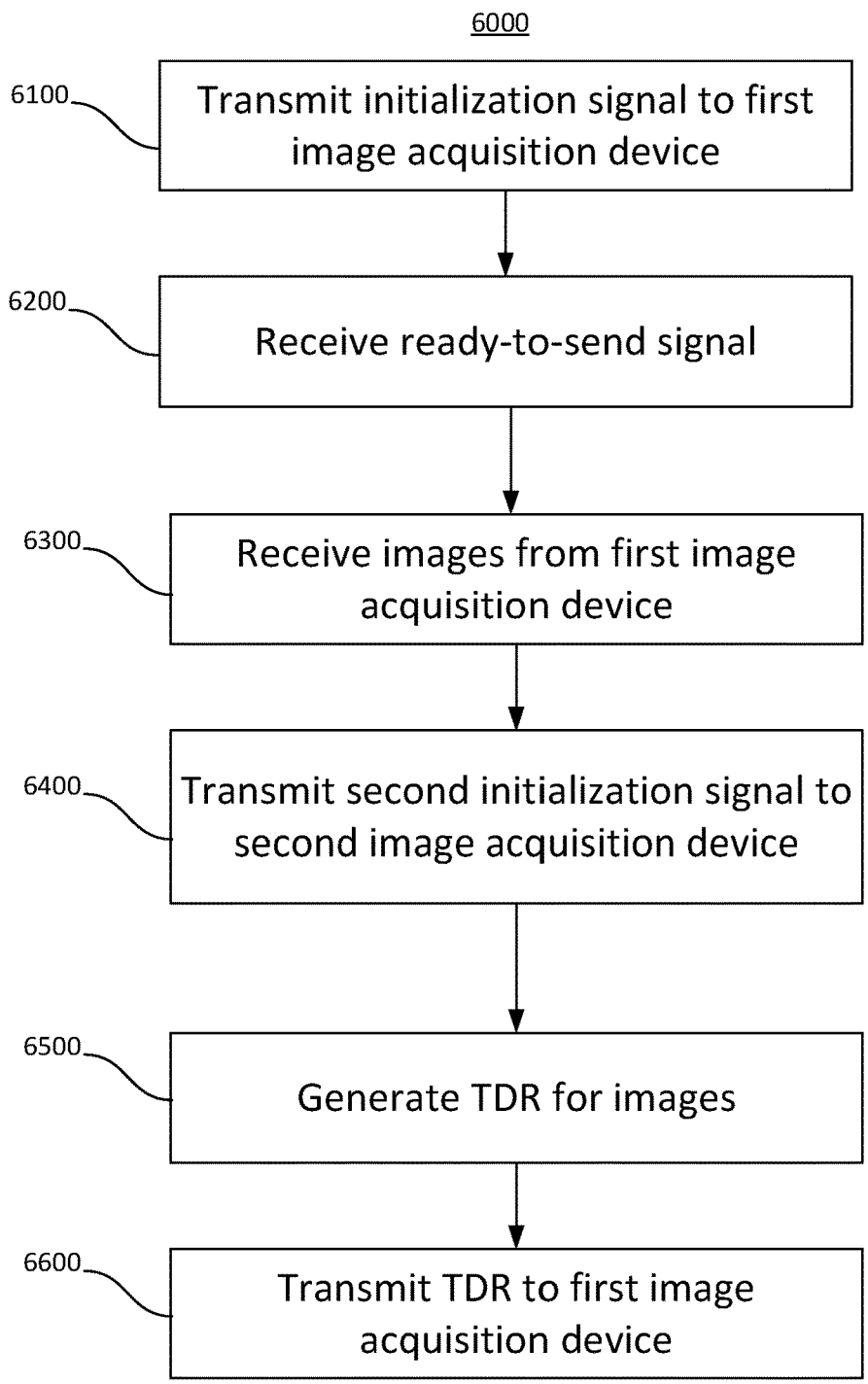
FIG. 6 is a method of receiving images from an image acquisition device, according to an exemplary embodiment of the present disclosure.

FIG. 6 is a method 6000 for receiving and analyzing scan images from the image acquisition device, according to one embodiment of the present disclosure. In one embodiment, the method 6000 can be performed by the remote viewing device 1000 located at a separate physical location (e.g., a different city, different airport) from the image acquisition device 1400. The remote viewing device 1000 can be coupled to a first networked device 1200, wherein the first networked device 1200 can perform one or more steps of the method 6000 to transmit and receive data over a communication channel over network. The remote viewing device 1000 can transmit an initialization signal to one or more image acquisition devices 1400 in step 6100. The initialization signal can be a broadcast and can include a message, e.g., a bit flag, that the remote viewing device 1000 is ready to receive and analyze a scan image. The remote viewing device 1000 can receive a ready-to-send signal from an image acquisition device 1400 in response to the initialization signal in step 6200. The ready-to-send signal can include a storage location of images, such as a scan image and a TDR-CT for analysis. The storage location can be, for example a memory location in the image acquisition device 1400. The ready-to-send signal can be transmitted to the remote viewing device 1000 based on a queue of remote viewing devices stored by the image acquisition device 1400. For example, the queue can be ordered based on an order of initialization signals that are transmitted to the image acquisition device 1400. The remote viewing device 1000 can then receive a first scan image or set of scan images from the image acquisition device 1400 in step 6300.

In one embodiment, the remote viewing device 1000 can transmit a busy signal to other image acquisition devices while receiving images from a present image acquisition device 1400. The busy signal can indicate that the remote viewing device 1000 is not available to receive images from the other image acquisition devices. The remote viewing device 1000 can later be available to receive scan images from the other image acquisition devices. In one embodiment, the remote viewing device 1000 can transmit a second initialization signal to a second image acquisition device in step 6400 when the remote viewing device is available to receive a second scan image or set of scan images. The remote viewing device 1000 can transmit the second initialization signal to the second image acquisition device before generating and/or transmitting a threat detection report to the first image acquisition device. The remote viewing device 1000 can then receive the second set of images from the second image acquisition device. The remote viewing device 1000 can generate the threat detection report for the first set of images in step 6500. In one embodiment, the remote viewing device 1000 can generate the threat detection report for the first set of images while receiving the second set of images. The reception of the second set of images in advance can reduce latency in the transmission of images and threat detection reports between the remote viewing device and the image acquisition device. For example, the remote viewing device 1000 can load and display the second set of images immediately after generating the threat detection report for the first set of images because of the advance reception. In step 6600, the remote viewing device 1000 can transmit the threat detection report to the image acquisition device that transmitted the first set of images. The image acquisition device can then process or take further steps in response to the threat detection report.

It can be appreciated that the methods 5000 and 6000 are presented as non-limiting embodiments of the present disclosure wherein the image acquisition device 1400 is in direct communication with the remote viewing device 1000. In one embodiment, the remote device of the method 5000 can be a networked device, such as the first networked device 1200 coupled to a remote viewing device, as has been described herein. The image acquisition device 1400 can transmit data to the networked device, wherein the networked device can then transmit the data to the remote viewing device 1000. Similarly, the image acquisition device of FIG. 6 can include a networked device 1500 coupled to an image acquisition device. The networked device 1500 can receive signals, such as the initialization signal, and can transmit images from the image acquisition device in response to an initialization signal. The networked device 1500 can also store and manage a queue of available remote viewing devices.

In one embodiment, a remote viewing device 1000 can implement a time limit for image analysis. For example, the remote viewing device 1000 can display a scan image with an overlayed TDR for a period of time. The time limit can be a preset limit and/or can be a limit that is modified over time. For example, the time limit can be dependent on a user account that is active on the remote viewing device 1000. When the remote viewing device 1000 has displayed the scan image for the time limit without receiving an input to generate a TDR-IO, the remote viewing device 1000 can stop displaying the scan image and can terminate a connection (e.g., a channel) with the image acquisition device 1400. In one embodiment, the connection between the remote viewing device 1000 and the image acquisition device 1400 can automatically terminate after a set amount of time if no data is transmitted over the connection. For example, the connection can terminate after 2 seconds if the image acquisition device 1400 does not receive a TDR-IO or a null signal from the remote viewing device 1000. In one embodiment, the termination time can be dependent on the speed of transmission, e.g., 5 times the average time that is needed to transmit a TDR to the image acquisition device 1400.

In one embodiment, the remote viewing device 1000 can terminate the connection by transmitting a termination (e.g., FIN) packet to the image acquisition device 1400. The image acquisition device 1400 can continue to the generation of the verification signal in response to the termination or timeout of the connection with the remote viewing device 1000. The verification signal can be generated by the image acquisition device 1400 based on an input to the image acquisition device 1400, e.g., via a user interface. For example, a security officer at the airport can manually inspect the luggage because the scan image could not be analyzed at the remote viewing device 1000. The results of the manual inspection can be used to generate the verification signal. The image acquisition device 1400 can then transmit the verification signal to the metrics server 1500. The verification signal can indicate that the image acquisition device 1400 did not receive a TDR-IO from the remote viewing device 1000. In one embodiment, the image acquisition device 1400 can render and display the scan image and the TDR and can also generate a TDR-IO when the remote viewing device 1000 is not available. The image acquisition device 1400 can transmit a metrics signal to the metrics server 1500 based on the TDR generated at the image acquisition device 1400.

In one embodiment, a scan image from an image acquisition device 1400 can be transmitted to more than one remote viewing device 1000. For example, an image acquisition device 1400 can select two remote viewing devices from a local queue of available remote viewing devices and transmit the same live scan image and TDR to each of the two remote viewing devices. In one embodiment, the image acquisition device 1400 can select the remote viewing devices based on an initialization signal or broadcast from the remote viewing devices. The initialization signal from a remote viewing device can include a flag or similar data field indicating that an image transmitted to the remote viewing device should also be transmitted to an additional remote viewing device. For example, the active user account on the remote viewing device can be associated with a security officer who is new or still in training. Thus, it can be desirable to have a second security officer review the same images on the additional remote viewing device to avoid false negative results. Increasing the number of assessments for a single image can increase the probability of threat detection. The image acquisition device 1400 can identify the flag in the initialization broadcast and can transmit the scan image and the TDR to the first remote viewing device and the additional (second) remote viewing device. In one embodiment, the first remote viewing device and the second remote viewing device can transmit a first TDR-IO and a second TDR-IO, respectively, to the image acquisition device. The first TDR-IO and the second TDR-IO can be verified at the image acquisition device 1400 and the image acquisition device 1400 can transmit a first metrics signal, associated with an active user account on the first remote viewing device, and a second metrics signal, associated with an active user account on the second remote viewing device, to the metrics server.

In one embodiment, the rate or frequency of transmission to more than one remote viewing device can depend on a probability of threat detection ($P_d$) and a probability of false alarms ($P_{fa}$) for an image. $P_d$ and $P_{fa}$ can depend on a type of threat. The metrics server 1500 can calculate and store a probability of detection for a type of threat based on the metrics that have been collected and analyzed from assessment of scan images. The detection accuracy can be accessed by an image acquisition device 1400 and/or a remote viewing device 1000. According to one example, $P_d$ can be calculated as $1-(1-N_d)^X$, where $N_d$ is the probability of detection and X is the number of remote viewing devices receiving the image for assessment. $P_{fa}$ can be calculated as $1-(1-N_{fa})^X$, where $N_{fa}$ is the probability of a false positive and X is the number of remote viewing devices receiving the image for assessment. Increasing X can increase the probability of detection but can also increase the probability of a false alarm. In one embodiment, a remote viewing device can control the rate or frequency of transmission to more than one remote viewing device based on network traffic, $N_d$, and $N_{fa}$ and can optimize a frequency of transmission to more than one remote viewing device based on network conditions.

In one embodiment, the networked servers, e.g., the semaphore server 1600 and the metrics server 1300, can be virtualized and replicated across viewing centers. In one embodiment, a single server can perform the functionalities of the semaphore server 1600 and the metrics server 1300, including, but not limited to, transmitting data to and receiving data from the remote viewing devices 1000, accessing the image acquisition devices 1400, and storing metrics data. The single server can be referred to herein as a remote viewing server. In one embodiment, the remote viewing server can also store scan images from the image acquisition devices 1400. The remote viewing server can, for example, store scan images. In one embodiment, the remote viewing server can be sharded, or partitioned, across separate server hardware. The server hardware can include virtualized servers. In one embodiment, the shards can be distributed across viewing centers.

According to one architecture embodiment, the remote viewing server can be partitioned into shards, e.g., three shards (Shard A, Shard B, Shard C), wherein each shard can be hosted by a server at a viewing center, e.g., an airport. Each shard can receive transmissions from the remote viewing devices in the viewing center and can store metrics from the remote viewing devices in the viewing center. Each shard can also be replicated. Each viewing center server can store a primary shard and two replica shards. For example, a first viewing center server can store Shard A as a primary shard and replicas of Shard B and Shard C. A second viewing center server can store Shard B as a primary shard and replicas of Shard A and Shard C. A third viewing center server can store Shard C as a primary shard and replicas of Shard A and Shard B. The primary shard at each viewing center server can receive and store data from the remote viewing devices at the viewing center. The primary shard can stream new data to the replica shards in other viewing center servers for replication. The shards within a viewing center server can stream new data to each other until the shards converge and all store the same data. The replication of data can be asynchronous. In one embodiment, the viewing center servers can be in network communication with each other to continuously update the shard replicas. Each viewing center server can store a complete copy of the data that is spread across all three shards. The replica shards stored at each viewing center server can be configured as backups for the shards located at other viewing center servers. The partitioned and replicated server architecture can be scaled across different numbers of viewing centers. The remote viewing devices in each viewing center can thus write to a shared data storage with a distributed structure of viewing data in the remote viewing server. The distribution of shards also allows for maximum fault tolerance such that the system can continue to operate without degradation even if more than one viewing center fails or loses connectivity.

The following are presented as examples of the systems and methods for remote display and assessment of scan images as described herein. In one embodiment, the image acquisition devices 1400 (e.g., CT scanners) can be connected to a local area network (LAN) with dedicated cabling, e.g., Category 5c or 6 cabling. The CT scanner traffic can be separated from other network traffic within the LAN by a virtual LAN (VLAN), software encryption, or similar suitable partition. The image acquisition devices can be connected via the cabling to a concentrator, wherein the concentrator can be connected to one or more independent internet service providers (ISP) for internet service with redundancy. The line speed for transmission between the airport and a viewing center can be approximately 1 Gbps (Gigabits per second).

According to one non-limiting embodiment, a CT scanner in an airport can produce approximately one scan image every 10.3 seconds. A single 1 Gbps connection can support 24 CT scanners under 80% peak saturation levels, wherein a CT scanner can actively send images 15.4% of the time during peak processing. In one embodiment, a set of images (e.g., scan image, TDR-CT annotation) can be transferred in approximately 1.58 seconds at an average speed of 0.213 Gbps. Each CT scanner can utilize approximately 3.27% of the 1 Gbps line. In one embodiment, the image acquisition devices 1400 can be connected to the remote viewing devices 1000 via a wide area network (WAN). For example, a first networked device 1200 coupled to a remote viewing device 1000 can be connected to a second networked device 1500 coupled to an image acquisition device 1400 via a WAN connection. The WAN can be established across one or more network hardware devices, including routers and switches. While TCP/IP channels have been described herein to facilitate data transfer between devices, it can be appreciated that other network communication/transfer protocols, including multiplexing network protocols, and any corresponding network hardware are compatible with the present disclosure. For example, File Transfer Protocol (FTP) or Network File System (NFS) architectures with secure tunnels ("stunnels") can be implemented to transfer data between the image acquisition devices 1400 and the remote viewing devices 1000.

In one embodiment, the image acquisition device 1400 and the remote viewing device 1000 can implement hardware point-to-point encryption to encrypt data for transmission. In one embodiment, the image acquisition device 1400 and the remote viewing device 1000 can implement a point-to-point software encryption scheme. The encryption can be implemented separately from digital signing of the data. In one embodiment, the data can be encrypted in transmission, e.g., using Secure FTP (SFTP) or Secure Copy Protocol (SCP).

In one embodiment, the remote viewing device 1000 and the image acquisition device 1400 can generate and display a real-time monitoring dashboard, wherein the dashboard can be a user interface that is updated based on performance of one or more remote viewing devices 1000 and image acquisition devices 1400 in an environment. In one embodiment, the data for the dashboard can be stored at a central server and can be transmitted to each device.

Embodiments of the subject matter and the functional operations described in this specification can be implemented by digital electronic circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of data processing apparatus, such as the remote viewing device 1000, the image acquisition device 1400, the first and second networked devices 1200, 1500, the server 1600, the metrics data server 1300, and the like. The computer storage medium can be a machine-readable storage device, a machine-readable storage substrate, a random or serial access memory device, or a combination of one or more of them.

The term "data processing apparatus" refers to data processing hardware and may encompass all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, Subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA an ASIC.

Computers suitable for the execution of a computer program include, by way of example, general or special purpose microprocessors or both, or any other kind of central processing unit. Generally, a CPU will receive instructions and data from a read-only memory or a random access memory or both. Elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more Such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients (user devices) and servers. A client and server are generally remote from each other and typically interact through a communication network. The relationship of client and server arises by virtue of computer programs running on the respective computers and having a client-server relationship to each other. In an embodiment, a server transmits data, e.g., an HTML, page, to a user device, e.g., for purposes of displaying data to and receiving user input from a user interacting with the user device, which acts as a client. Data generated at the user device, e.g., a result of the user interaction, can be received from the user device at the server.

Figure 7:
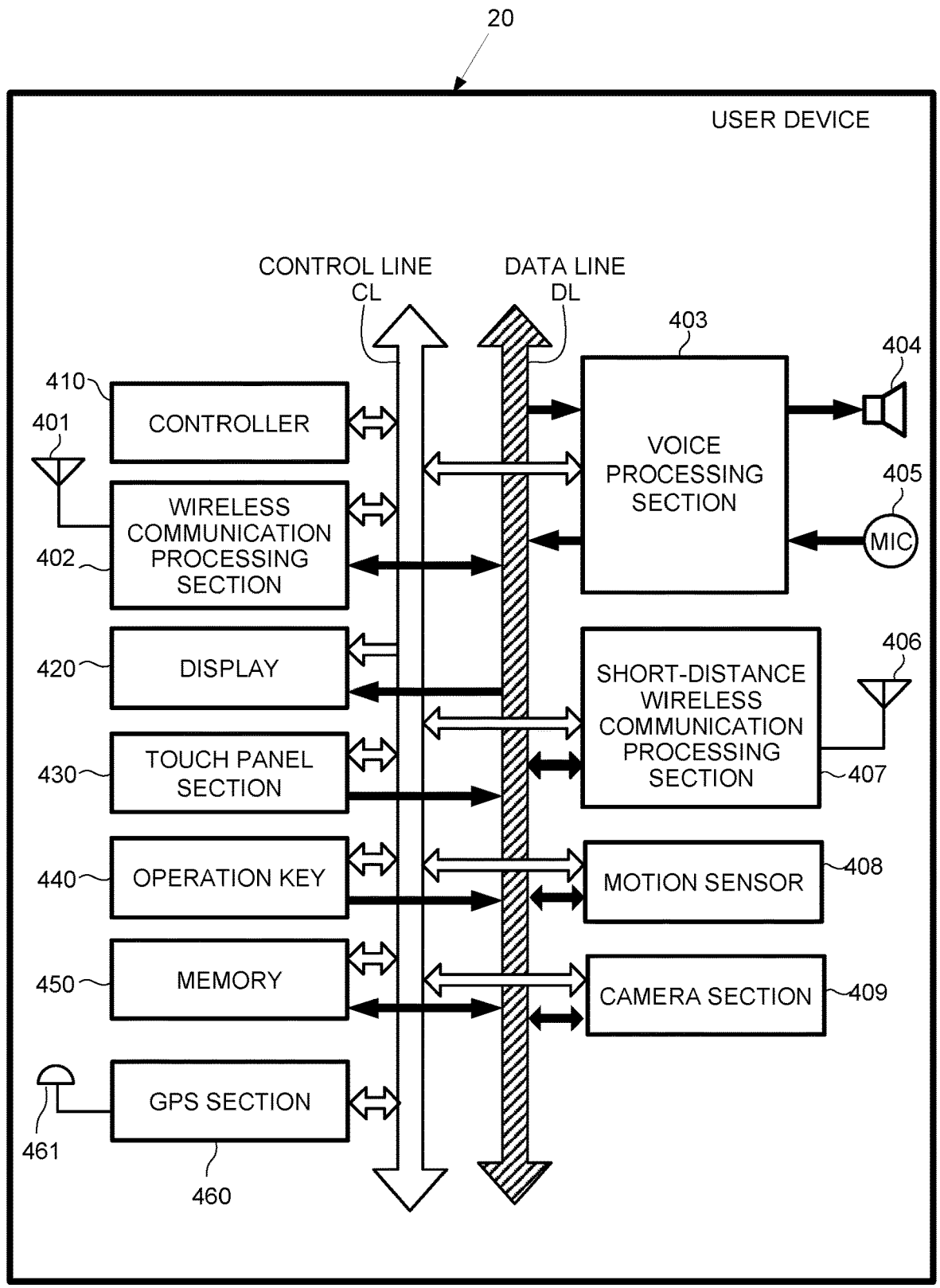
FIG. 7 is a schematic of a user device for performing a method, according to an exemplary embodiment of the present disclosure.

Electronic user device 20 shown in FIG. 7 can be an example of one or more of the devices described herein, including the remote viewing device 1000 and the image acquisition device 1400. In an embodiment, the electronic user device 20 may be a smartphone. However, the skilled artisan will appreciate that the features described herein may be adapted to be implemented on other devices (e.g., a laptop, a tablet, a server, an e-reader, a camera, a navigation device, etc.). The exemplary user device 20 of FIG. 7 includes processing circuitry, as discussed above. The processing circuitry includes one or more of the elements discussed next with reference to FIG. 7. The electronic user device 20 may include other components not explicitly illustrated in FIG. 7 such as a CPU, GPU, frame buffer, etc. The electronic user device 20 includes a controller 410 and a wireless communication processor 402 connected to an antenna 401. A speaker 404 and a microphone 405 are connected to a voice processor 403.

The controller 410 may include one or more processors/ processing circuitry (CPU, GPU, or other circuitry) and may control each element in the user device 20 to perform functions related to communication control, audio signal processing, graphics processing, control for the audio signal processing, still and moving image processing and control, and other kinds of signal processing. The controller 410 may perform these functions by executing instructions stored in a memory 450. Alternatively or in addition to the local storage of the memory 450, the functions may be executed using instructions stored on an external device accessed on a network or on a non-transitory computer readable medium.

The memory 450 includes but is not limited to Read Only Memory (ROM), Random Access Memory (RAM), or a memory array including a combination of volatile and non-volatile memory units. The memory 450 may be utilized as working memory by the controller 410 while executing the processes and algorithms of the present disclosure. Additionally, the memory 450 may be used for long-term storage, e.g., of image data and information related thereto.

The user device 20 includes a control line CL and data line DL as internal communication bus lines. Control data to/from the controller 410 may be transmitted through the control line CL. The data line DL may be used for transmission of voice data, displayed data, etc.

The antenna 401 transmits/receives electromagnetic wave signals between base stations for performing radio-based communication, such as the various forms of cellular telephone communication. The wireless communication processor 402 controls the communication performed between the user device 20 and other external devices via the antenna 401. For example, the wireless communication processor 402 may control communication between base stations for cellular phone communication.

The speaker 404 emits an audio signal corresponding to audio data supplied from the voice processor 403. The microphone 405 detects surrounding audio and converts the detected audio into an audio signal. The audio signal may then be output to the voice processor 403 for further processing. The voice processor 403 demodulates and/or decodes the audio data read from the memory 450 or audio data received by the wireless communication processor 402 and/or a short-distance wireless communication processor 407. Additionally, the voice processor 403 may decode audio signals obtained by the microphone 405.

The exemplary user device 20 may also include a display 420, a touch panel 430, an operation key 440, and a short-distance communication processor 407 connected to an antenna 406. The display 420 may be a Liquid Crystal Display (LCD), an organic electroluminescence display panel, or another display screen technology. In addition to displaying still and moving image data, the display 420 may display operational inputs, such as numbers or icons which may be used for control of the user device 20. The display 420 may additionally display a GUI for a user to control aspects of the user device 20 and/or other devices. Further, the display 420 may display characters and images received by the user device 20 and/or stored in the memory 450 or accessed from an external device on a network. For example, the user device 20 may access a network such as the Internet and display text and/or images transmitted from a Web server.

The touch panel 430 may include a physical touch panel display screen and a touch panel driver. The touch panel 430 may include one or more touch sensors for detecting an input operation on an operation surface of the touch panel display screen. The touch panel 430 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus may include a conductive material at least at the tip of the stylus such that the sensors included in the touch panel 430 may detect when the stylus approaches/ contacts the operation surface of the touch panel display (similar to the case in which a finger is used for the touch operation).

In certain aspects of the present disclosure, the touch panel 430 may be disposed adjacent to the display 420 (e.g., laminated) or may be formed integrally with the display 420. For simplicity, the present disclosure assumes the touch panel 430 is formed integrally with the display 420 and therefore, examples discussed herein may describe touch operations being performed on the surface of the display 420 rather than the touch panel 430. However, the skilled artisan will appreciate that this is not limiting.

For simplicity, the present disclosure assumes the touch panel 430 is a capacitance-type touch panel technology. However, it should be appreciated that aspects of the present disclosure may easily be applied to other touch panel types (e.g., resistance-type touch panels) with alternate structures. In certain aspects of the present disclosure, the touch panel 430 may include transparent electrode touch sensors arranged in the X-Y direction on the surface of transparent sensor glass.

The touch panel driver may be included in the touch panel 430 for control processing related to the touch panel 430, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. For example, in an embodiment, the touch panel 430 may detect a position of a user's finger around an edge of the display panel 420 (e.g., gripping a protective case that surrounds the display/touch panel). Signals may be transmitted by the touch panel driver, e.g., in response to a detection of a touch operation, in response to a query from another element based on timed data exchange, etc.

The touch panel 430 and the display 420 may be surrounded by a protective casing, which may also enclose the other elements included in the user device 20. In an embodiment, a position of the user's fingers on the protective casing (but not directly on the surface of the display 420) may be detected by the touch panel 430 sensors. Accordingly, the controller 410 may perform display control processing described herein based on the detected position of the user's fingers gripping the casing. For example, an element in an interface may be moved to a new location within the interface (e.g., closer to one or more of the fingers) based on the detected finger position.

Further, in an embodiment, the controller 410 may be configured to detect which hand is holding the user device 20, based on the detected finger position. For example, the touch panel 430 sensors may detect fingers on the left side of the user device 20 (e.g., on an edge of the display 420 or on the protective casing), and detect a single finger on the right side of the user device 20. In this exemplary scenario, the controller 410 may determine that the user is holding the user device 20 with his/her right hand because the detected grip pattern corresponds to an expected pattern when the user device 20 is held only with the right hand.

The operation key 440 may include one or more buttons or similar external control elements, which may generate an operation signal based on a detected input by the user. In addition to outputs from the touch panel 430, these operation signals may be supplied to the controller 410 for performing related processing and control. In certain aspects of the present disclosure, the processing and/or functions associated with external buttons and the like may be performed by the controller 410 in response to an input operation on the touch panel 430 display screen rather than the external button, key, etc. In this way, external buttons on the user device 20 may be eliminated in lieu of performing inputs via touch operations, thereby improving watertightness.

The antenna 406 may transmit/receive electromagnetic wave signals to/from other external apparatuses, and the short-distance wireless communication processor 407 may control the wireless communication performed between the other external apparatuses. Bluetooth, IEEE 802.11, and near-field communication (NFC) are non-limiting examples of wireless communication protocols that may be used for inter-device communication via the short-distance wireless communication processor 407.

The user device 20 may include a motion sensor 408. The motion sensor 408 may detect features of motion (i.e., one or more movements) of the user device 20. For example, the motion sensor 408 may include an accelerometer to detect acceleration, a gyroscope to detect angular velocity, a geomagnetic sensor to detect direction, a geo-location sensor to detect location, etc., or a combination thereof to detect motion of the user device 20. In an embodiment, the motion sensor 408 may generate a detection signal that includes data representing the detected motion. For example, the motion sensor 408 may determine a number of distinct movements in a motion (e.g., from start of the series of movements to the stop, within a predetermined time interval, etc.), a number of physical shocks on the user device 20 (e.g., a jarring, hitting, etc., of the electronic device), a speed and/or acceleration of the motion (instantaneous and/or temporal), or other motion features. The detected motion features may be included in the generated detection signal. The detection signal may be transmitted, e.g., to the controller 410, whereby further processing may be performed based on data included in the detection signal. The motion sensor 408 can work in conjunction with a Global Positioning System (GPS) section 460. The information of the present position detected by the GPS section 460 is transmitted to the controller 410. An antenna 461 is connected to the GPS section 460 for receiving and transmitting signals to and from a GPS satellite.

The user device 20 may include a camera section 409, which includes a lens and shutter for capturing photographs of the surroundings around the user device 20. In an embodiment, the camera section 409 captures surroundings of an opposite side of the user device 20 from the user. The images of the captured photographs can be displayed on the display panel 420. A memory section saves the captured photographs. The memory section may reside within the camera section 109 or it may be part of the memory 450. The camera section 409 can be a separate feature attached to the user device 20 or it can be a built-in camera feature.

Figure 8:
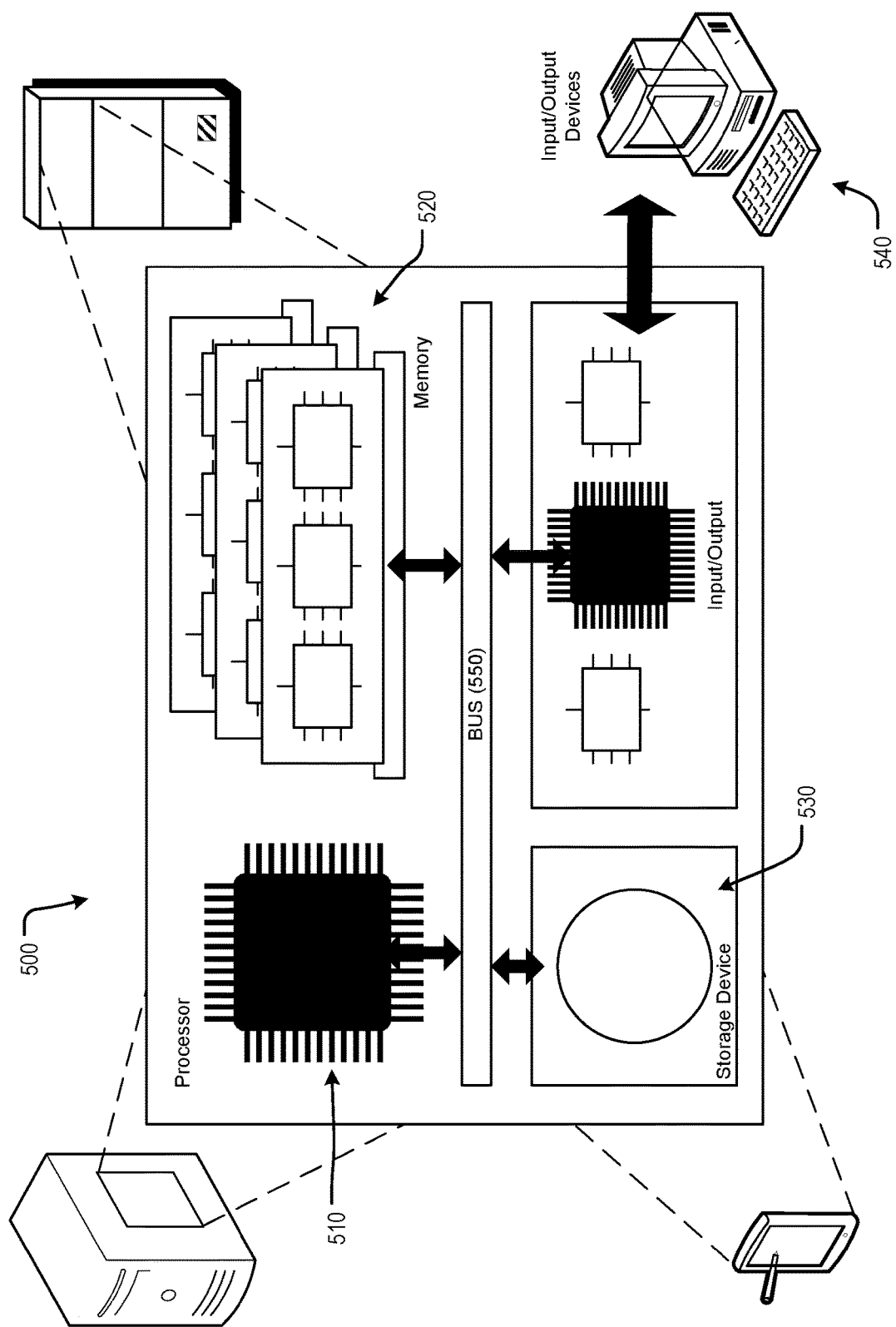
FIG. 8 is a schematic of a hardware system for performing a method, according to an exemplary embodiment of the present disclosure.

An example of a type of computer is shown in FIG. 8. The computer 500 can be used for the operations described in association with any of the computer-implement methods described previously, according to one implementation. For example, the computer 500 can be an example of a remote viewing device 1000, the data store 1300, or a networked device, e.g., the semaphore server 1200, the metrics server 1500 including processing circuitry, as discussed herein. In one embodiment, the computer 500 can be an example of a processor of an image acquisition device 1400. The processing circuitry includes one or more of the elements discussed next with reference to FIG. 8. In FIG. 8, the computer 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the computer 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the computer 500. In one implementation, the storage device 530 is a computer-readable medium. In various different implementations, the storage device 530 may be a floppy disk device, a hard disk device, an optical disk device, or a tape device.

The input/output device 540 provides input/output operations for the computer 500. In one implementation, the input/output device 540 includes a keyboard and/or pointing device. In another implementation, the input/output device 540 includes a display unit for displaying graphical user interfaces.

Figure 9:
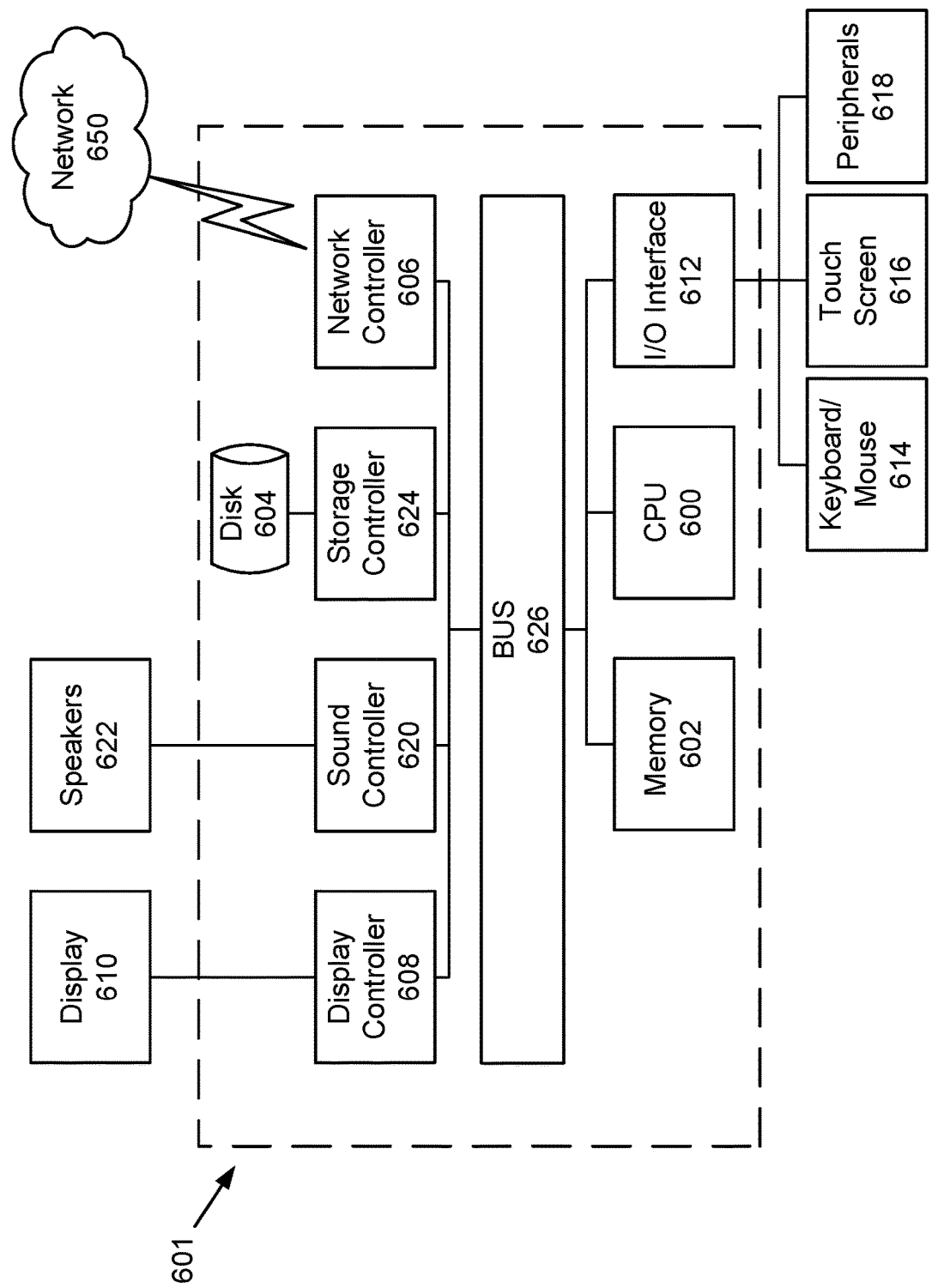
FIG. 9 is a schematic of a hardware configuration of a device for performing a method, according to an exemplary embodiment of the present disclosure.

Next, a hardware description of a device 601 according to exemplary embodiments is described with reference to FIG. 9. In FIG. 9, the device 601, which can be any of the above described devices, including the remote viewing device 1000, a processor of the image acquisition device 1400, the networked devices 1200, 1500, and the server 1600 and metrics server 1300, includes processing circuitry. The processing circuitry includes one or more of the elements discussed next with reference to FIG. 9. The process data and instructions may be stored in memory 602. These processes and instructions may also be stored on a storage medium disk 604 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the device 601 communicates, such as a server or computer.

Further, the claimed advancements may be provided as a utility application, background daemon, or component of an operating system, or combination thereof, executing in conjunction with CPU 600 and an operating system such as Microsoft Windows, UNIX, Solaris, LINUX, Apple MAC-OS and other systems known to those skilled in the art.

The hardware elements in order to achieve the device 601 may be realized by various circuitry elements, known to those skilled in the art. For example, CPU 600 may be a Xenon or Core processor from Intel of America or an Opteron processor from AMD of America, or may be other processor types that would be recognized by one of ordinary skill in the art. Alternatively, the CPU 600 may be implemented on an FPGA, ASIC, PLD or using discrete logic circuits, as one of ordinary skill in the art would recognize. Further, CPU 600 may be implemented as multiple processors cooperatively working in parallel to perform the instructions of the processes described above.

The device 601 in FIG. 9 also includes a network controller 606, such as an Intel Ethernet PRO network interface card from Intel Corporation of America, for interfacing with network 650. and to communicate with the other devices. As can be appreciated, the network 650 can be a public network, such as the Internet, or a private network such as an LAN or WAN network, or any combination thereof and can also include PSTN or ISDN sub-networks. The network 650 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The device 601 further includes a display controller 608, such as a NVIDIA GeForce GTX or Quadro graphics adaptor from NVIDIA Corporation of America for interfacing with display 610, such as an LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners.

A sound controller 620 is also provided in the device 601 to interface with speakers/microphone 622 thereby providing sounds and/or music.

The general purpose storage controller 624 connects the storage medium disk 604 with communication bus 626, which may be an ISA, EISA, VESA, PCI, or similar, for interconnecting all of the components of the device 601. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

While this specification contains many specific implementation details, these should not be construed as limitations on the scope of what may be claimed, but rather as descriptions of features that may be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Embodiments of the present disclosure may also be set forth in the following parentheticals.

(1) A method for remote identification of security threats in an imaged object, the method comprising transmitting, via processing circuitry, an initialization signal to a first threat detection scanner over a communication network, the first threat detection scanner being located at a separate physical location; receiving, via the processing circuitry, a ready-to-send signal from the first threat detection scanner over the communication network, the ready-to-send signal including a storage location of a scan image generated by the first threat detection scanner for security inspection; receiving, via the processing circuitry, the scan image from the first threat detection scanner over the communication network, the scan image being encrypted and compressed; transmitting, via the processing circuitry and after receiving the scan image from the first threat detection scanner, a second initialization signal to a second threat detection scanner at the separate physical location over the communication network; generating, via the processing circuitry, a threat detection report based on a rendering of the scan image, the threat detection report indicating a security threat in the scan image; and transmitting, via the processing circuitry, the threat detection report to the first threat detection scanner over the communication network.

(2) The method of (1), wherein the scan image includes an initial threat detection report, wherein the scan image is generated by downsampling an image or an image slice and wherein the initial threat detection report is generated based on the image or the image slice.

(3) The method of (1) to (2), wherein the scan image is compressed while the initial threat detection report is being generated.

(4) The method of (1) to (3), wherein the scan image is generated during acquisition of the image or the image slice by the first threat detection scanner.

(5) The method of (1) to (4), wherein the ready-to-send signal is received based on a queue of devices, wherein an ordering of the queue is based on the initialization signal.

(6) The method of (1) to (5), further comprising receiving, via the processing circuitry, a second ready-to-send signal and a second scan image from the second threat detection scanner prior to transmitting the threat detection report to the first threat detection scanner.

(7) The method of (1) to (6), further comprising transmitting, via the processing circuitry, a busy signal to the second threat detection scanner over the communication network while receiving the scan image from the first threat detection scanner and prior to transmitting the second initialization signal.

(8) A device comprising processing circuitry configured to transmit an initialization signal to a first threat detection scanner over a communication network, the first threat detection scanner being located at a separate physical location from the device, receive a ready-to-send signal from the first threat detection scanner over the communication network, the ready-to-send signal including a storage location of a scan image generated by the first threat detection scanner for security inspection; receive the scan image from the first threat detection scanner over the communication network, the scan image being encrypted and compressed, transmit, after receiving the scan image from the first threat detection scanner, a second initialization signal to a second threat detection scanner at the separate physical location over the communication network, generate a threat detection report based on a rendering of the scan image, the threat detection report indicating a security threat in the scan image; and transmit the threat detection report to the first threat detection scanner over the communication network.

(9) The device of (8), wherein the scan image includes an initial threat detection report, wherein the scan image is generated by downsampling an image or an image slice and wherein the initial threat detection report is generated based on the image or the image slice.

(10) The device of (8) to (9), wherein the scan image is compressed while the initial threat detection report is being generated.

(11) The device of (8) to (10), wherein the scan image is generated during acquisition of the image or the image slice by the first threat detection scanner.

(12) The device of (8) to (11), wherein the processing circuitry is further configured to receive a second ready-to-send signal and a second scan image from the second threat detection scanner prior to transmitting the threat detection report to the first threat detection scanner.

(13) The device of (8) to (12), wherein the processing circuitry is further configured to transmit a busy signal to the second threat detection scanner over the communication network while receiving the scan image from the first threat detection scanner and prior to transmitting the second initialization signal.

(14) A non-transitory computer-readable storage medium for storing computer-readable instructions that, when executed by a computer, cause the computer to perform a method, the method comprising: transmitting an initialization signal to a first threat detection scanner over a communication network, the first threat detection scanner being located at a separate physical location from the computer; receiving a ready-to-send signal from the first threat detection scanner over the communication network, the ready-to-send signal including a storage location of a scan image generated by the first threat detection scanner for security inspection; receiving the scan image from the first threat detection scanner over the communication network, the scan image being encrypted and compressed; transmitting, after receiving the scan image from the first threat detection scanner, a second initialization signal to a second threat detection scanner at the separate physical location over the communication network; generating a threat detection report based on a rendering of the scan image, the threat detection report indicating a presence of a security threat in the scan image; and transmitting the threat detection report to the first threat detection scanner over the communication network.

(15) The non-transitory computer-readable storage medium of (14), wherein the scan image includes an initial threat detection report, wherein the scan image is generated by downsampling an image or an image slice and wherein the initial threat detection report is generated based on the image or the image slice.

(16) The non-transitory computer-readable storage medium of (14) to (15), wherein the scan image is compressed while the initial threat detection report is being generated.

(17) The non-transitory computer-readable storage medium of (14) to (16), wherein the scan image is generated during acquisition of the image or the image slice by the first threat detection scanner.

(18) The non-transitory computer-readable storage medium of (14) to (17), wherein the ready-to-send signal is received based on a queue of computers, wherein an order of the computers in the queue is based on the initialization signal.

(19) The non-transitory computer-readable storage medium of (14) to (18), further comprising receiving, via the processing circuitry, a second ready-to-send signal and a second scan image from the second threat detection scanner prior to transmitting the threat detection report to the first threat detection scanner.

(20) The non-transitory computer-readable storage medium of (14) to (19), further comprising transmitting, via the processing circuitry, a busy signal to the second threat detection scanner over the communication network while receiving the scan image from the first threat detection scanner and prior to transmitting the second initialization signal.

(21) The method of (1) to (7), wherein the first threat detection scanner includes a first imaging device coupled to a first networked device.

(22) The device of (8) to (13), wherein the first threat detection scanner includes a first imaging device coupled to a first networked device.

(23) The device of (8) to (13) and (22), wherein the device is coupled to a viewing device and wherein the viewing device is configured to display the rendering of the scan image.

(24) The non-transitory computer-readable storage medium of (14) to (20), wherein the first threat detection scanner includes a first imaging device coupled to a first networked device.

(25) The method of (1) to (7) and (21), wherein the initialization signal includes a digital signature.

(26) The device of (8) to (13) and (22), wherein the initialization signal includes a digital signature.

(27) The non-transitory computer-readable storage medium of (14) to (20) and (24), wherein the initialization signal includes a digital signature.

Thus, the foregoing discussion discloses and describes merely exemplary embodiments of the present disclosure. As will be understood by those skilled in the art, the present disclosure may be embodied in other specific forms without departing from the spirit thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. A method for remote identification of security threats in an imaged object, the method comprising:
transmitting, via processing circuitry, an initialization signal to a first threat detection scanner over a communication network, the first threat detection scanner being located at a separate physical location;
receiving, via the processing circuitry, a ready-to-send signal from the first threat detection scanner over the communication network, the ready-to-send signal including a storage location of a scan image generated by the first threat detection scanner for security inspection;
receiving, via the processing circuitry, the scan image from the first threat detection scanner over the communication network, the scan image being encrypted and compressed;
transmitting, via the processing circuitry and after receiving the scan image from the first threat detection scanner, a second initialization signal to a second threat detection scanner at the separate physical location over the communication network;
generating, via the processing circuitry, a threat detection report based on a rendering of the scan image, the threat detection report indicating a security threat in the scan image; and
transmitting, via the processing circuitry, the threat detection report to the first threat detection scanner over the communication network.

2. The method of claim 1, wherein the scan image includes an initial threat detection report, wherein the scan image is generated by downsampling an image or an image slice and wherein the initial threat detection report is generated based on the image or the image slice.

3. The method of claim 2, wherein the scan image is generated during acquisition of the image or the image slice by the first threat detection scanner.

4. The method of claim 1, wherein the ready-to-send signal is received based on a queue of devices, wherein an ordering of the queue is based on the initialization signal.

5. The method of claim 1, further comprising receiving, via the processing circuitry, a second ready-to-send signal and a second scan image from the second threat detection scanner prior to transmitting the threat detection report to the first threat detection scanner.

6. The method of claim 1, further comprising transmitting, via the processing circuitry, a busy signal to the second threat detection scanner over the communication network while receiving the scan image from the first threat detection scanner and prior to transmitting the second initialization signal.

7. The method of claim 1, wherein the first threat detection scanner includes a first imaging device coupled to a first networked device.

8. The method of claim 1, wherein the initialization signal includes a digital signature.

9. A device comprising:
processing circuitry configured to:
transmit an initialization signal to a first threat detection scanner over a communication network, the first threat detection scanner being located at a separate physical location from the device,
receive a ready-to-send signal from the first threat detection scanner over the communication network, the ready-to-send signal including a storage location of a scan image generated by the first threat detection scanner for security inspection,
receive the scan image from the first threat detection scanner over the communication network, the scan image being encrypted and compressed,
transmit, after receiving the scan image from the first threat detection scanner, a second initialization signal to a second threat detection scanner at the separate physical location over the communication network,
generate a threat detection report based on a rendering of the scan image, the threat detection report indicating a security threat in the scan image, and
transmit the threat detection report to the first threat detection scanner over the communication network.

10. The device of claim 9, wherein the scan image includes an initial threat detection report, wherein the scan image is generated by downsampling an image or an image slice and wherein the threat detection report is generated based on the image or the image slice.

11. The device of claim 10, wherein the scan image is generated during acquisition of the image or the image slice by the first threat detection scanner.

12. The device of claim 9, wherein the processing circuitry is further configured to receive a second ready-to-send signal and a second scan image from the second threat detection scanner prior to transmitting the threat detection report to the first threat detection scanner.

13. The device of claim 9, wherein the first threat detection scanner includes a first imaging device coupled to a first networked device.

14. The device of claim 9, wherein the device is coupled to a viewing device and wherein the viewing device is configured to display the rendering of the scan image.

15. A non-transitory computer-readable storage medium for storing computer-readable instructions that, when executed by a computer, cause the computer to perform a method, the method comprising:
  transmitting an initialization signal to a first threat detection scanner over a communication network, the first threat detection scanner being located at a separate physical location from the computer;
  receiving a ready-to-send signal from the first threat detection scanner over the communication network, the ready-to-send signal including a storage location of a scan image generated by the first threat detection scanner for security inspection;
  receiving the scan image from the first threat detection scanner over the communication network, the scan image being encrypted and compressed;
  transmitting, after receiving the scan image from the first threat detection scanner, a second initialization signal to a second threat detection scanner at the separate physical location over the communication network;
  generating a threat detection report based on a rendering of the scan image, the threat detection report indicating a presence of a security threat in the scan image; and
  transmitting the threat detection report to the first threat detection scanner over the communication network.

16. The non-transitory computer-readable storage medium of claim 15, wherein the scan image includes an initial threat detection report, wherein the scan image is generated by downsampling an image or an image slice and wherein the threat detection report image is generated based on the image or the image slice.

17. The non-transitory computer-readable storage medium of claim 16, wherein the scan image is generated during acquisition of the image or the image slice by the first threat detection scanner.

18. The non-transitory computer-readable storage medium of claim 15, wherein the ready-to-send signal is received based on a queue of computers, wherein an order of the computers in the queue is based on the initialization signal.

19. The non-transitory computer-readable storage medium of claim 15, further comprising receiving, via the processing circuitry, a second ready-to-send signal and a second scan image from the second threat detection scanner prior to transmitting the threat detection report to the first threat detection scanner.

20. The non-transitory computer-readable storage medium of claim 15, wherein the first threat detection scanner includes a first imaging device coupled to a first networked device.

* * * * *